US012699885B1

(12) United States Patent
Kothari

(10) Patent No.: US 12,699,885 B1
(45) Date of Patent: Aug. 4, 2026

(54) SYSTEM AND METHOD FOR ADAPTIVE ORCHESTRATION OF MULTI-MODEL PROCESSING AND RESPONSE GENERATION

(71) Applicant: Co-AI Founder Technologies, Inc., Atlanta, GA (US)

(72) Inventor: Mimisha Joshi Kothari, Powder Springs, GA (US)

(73) Assignee: Co-AI Founder Technologies, Inc., Atlanta, GA (US)

( * ) Notice: Subject to any disclaimer, the term of this patent is extended or adjusted under 35 U.S.C. 154(b) by 0 days.

(21) Appl. No.: 19/351,259

(22) Filed: Oct. 6, 2025

Related U.S. Application Data

(60) Provisional application No. 63/832,744, filed on Jun. 30, 2025.

(51) Int. Cl.
| | |
|---|---|
| *G06N 3/0475* | (2023.01) |
| *G06F 16/9038* | (2019.01) |
(Continued)

(52) U.S. Cl.
CPC ....... *G06N 3/0475* (2023.01); *G06F 16/9038* (2019.01); *G06F 18/15* (2023.01);
(Continued)

(58) Field of Classification Search
CPC .... G06N 3/0475; G06N 5/04; G06F 16/9038; G06F 18/2178; G06F 18/15; G06F 18/213; G06F 2123/02; H04L 9/0643
See application file for complete search history.

(56) References Cited

U.S. PATENT DOCUMENTS

| | | |
|---|---|---|
| 11,232,383 B1 | 1/2022 | Burns, Sr. et al. |
| 11,803,764 B2 | 10/2023 | Beran et al. |
(Continued)

FOREIGN PATENT DOCUMENTS

WO          2024199653 A1    10/2024

OTHER PUBLICATIONS

Feng, Zerun, et al. "Temporal multimodal graph transformer with global-local alignment for video-text retrieval." IEEE Transactions on Circuits and Systems for Video Technology 33.3 (2022): 1438-1453. (Year: 2022).*

*Primary Examiner* — Bhavesh M Mehta
*Assistant Examiner* — Edward Tracy, Jr.
(74) *Attorney, Agent, or Firm* — Outlier Patent Attorneys, PLLC

(57) ABSTRACT

A computing system for orchestrated multi-model processing and response generation receives multimodal input data comprising text, audio, video, or gesture streams and generates structured signals in a schema-conformant representation. The structured signals are distributed to a plurality of small language models trained for domain-specific reasoning and to a large language model agent configured for generalized processing. The small language models generate domain-specific outputs and the large language model agent generates a generalized output. Arbitration logic resolves conflicts among the outputs by assigning priorities based on confidence values, domain weighting coefficients, and recency-of-evidence scores. Curated dataset inputs and validation feedback are incorporated into the arbitration results to refine arbitration weights, interrogation constraints, and model parameters. A synthesized response is generated from the arbitration results, the curated dataset inputs, and the validation feedback, and the synthesized response is pre-
(Continued)

sented as text, audio, or digital personal display output with synchronized directives.

17 Claims, 12 Drawing Sheets

(51) Int. Cl.

| | |
|---|---|
| *G06F 18/15* | (2023.01) |
| *G06F 18/21* | (2023.01) |
| *G06F 18/213* | (2023.01) |
| *G06F 123/02* | (2023.01) |
| *G06N 5/04* | (2023.01) |
| *H04L 9/06* | (2006.01) |

(52) U.S. Cl.
CPC ........ *G06F 18/213* (2023.01); *G06F 18/2178* (2023.01); *G06N 5/04* (2013.01); *H04L 9/0643* (2013.01); *G06F 2123/02* (2023.01)

(56) References Cited

U.S. PATENT DOCUMENTS

| | | | | |
|---|---|---|---|---|
| 11,825,022 | B1 | 11/2023 | Lim | |
| 11,954,445 | B2 | 4/2024 | Nichols et al. | |
| 12,346,384 | B2 | 7/2025 | Chrysanthou | |
| 2012/0054281 | A1 | 3/2012 | Westmoreland | |
| 2019/0012605 | A1 | 1/2019 | Rajagopal et al. | |
| 2021/0350263 | A1* | 11/2021 | Koneru | H04L 51/02 |
| 2021/0390401 | A1 | 12/2021 | Brooks et al. | |
| 2022/0391803 | A1 | 12/2022 | Alamir et al. | |
| 2023/0351216 | A1* | 11/2023 | Gelfenbeyn | G06N 3/006 |
| 2025/0173314 | A1* | 5/2025 | Gottlob | G06F 16/211 |
| 2025/0307877 | A1* | 10/2025 | Craft | G06Q 10/087 |
| 2025/0342346 | A1* | 11/2025 | Yin | G06N 3/0455 |

* cited by examiner

*502*

Obtain multimodal input data

*504*

Determine whether data contains required classification attributes

*506*

Eligible?

Yes

No

*508*

Eligible for training set?

*510*

Exclude from training set

*512*

Complete?

*514*

Store message data for training or model evaluation

*802* Retrieve Model Confidence Values

*804* Retrieve Domain Weighting Coefficients

*806* Compute Recency-of-Evidence Scores

*808* Rank Predictive Outputs

*810* Detect Conflicts Among Outputs

*812* Retrieve Curated Dataset Records

*814* Normalize Dataset Records

*816* Incorporate Validation Feedback

*818* Generate Arbitration Results

SYSTEM AND METHOD FOR ADAPTIVE ORCHESTRATION OF MULTI-MODEL PROCESSING AND RESPONSE GENERATION

CROSS-REFERENCE TO RELATED APPLICATIONS

This application claims priority to U.S. Provisional Patent Application No. 63/832,744, entitled "SYSTEM FOR GUIDING STARTUP DEVELOPMENT," filed on Jun. 30, 2025, the entire disclosure of which is incorporated herein by reference in its entirety.

FIELD OF THE ART

The systems and methods disclosed herein relate generally to machine learning and natural language processing systems and, more specifically, to multi-agent systems and methods for orchestrated multi-model processing using multimodal input analysis, arbitration logic, and feedback-driven response synthesis.

BACKGROUND

Users increasingly rely on machine learning systems to assist with complex reasoning tasks, yet conventional conversational models generally act as passive responders. Such systems often provide agreeable or surface-level responses and lack the capacity to interrogate user inputs, challenge assumptions, or guide iterative problem solving. This creates a gap between user needs for critical evaluation and the outputs typically provided by existing language models.

The demand for intelligent systems that process multimodal data streams, including natural language, audio, video, and gesture signals, has further increased as computing environments become more interactive. Conventional approaches often employ a single large-scale model to handle multiple modalities, but such reliance introduces limitations in accuracy, latency, and the ability to maintain context continuity across sessions.

Organizations increasingly attempt to adapt machine learning models for specialized domains by fine-tuning or retraining large language models. Existing systems, however, struggle to scale effectively across domains, and their outputs may lack interpretability when conflicting results occur. Such systems are prone to hallucinations, fail to enforce structured schema compliance, and require significant computational resources.

Developers and users commonly need models that generate predictive outputs consistent with both domain-specific requirements and generalized reasoning tasks. Conventional orchestration techniques generally provide ad hoc aggregation or majority voting across outputs, which fails to capture task dependencies or preserve workflow continuity. These methods also lack robust interrogation capabilities to detect contradictions or missing elements in predictive results.

Human validation and curated datasets are often used to improve model performance, but existing integration mechanisms remain limited. Current feedback loops rely on manual correction and do not systematically adjust arbitration weights, model parameters, or interrogation constraints. This restricts adaptability and prevents consistent improvement of downstream outputs across iterative cycles.

Despite the growing reliance on machine learning systems, there remain no effective computer-implemented techniques specifically directed to guiding startup development from ideation through scaling. Conventional tools may provide fragmented support for isolated tasks-such as document drafting, code generation, or financial modeling—but they lack coordinated orchestration across venture-building domains. This results in the absence of structured, adaptive guidance that integrates legal, fundraising, technical, partnerships, social impact, market development, and other considerations into a unified workflow.

Accordingly, improved computer-implemented techniques for orchestrating multimodal inputs, coordinating domain-specific and generalized models, and synthesizing responses with integrated arbitration, validation, and feedback are desirable.

SUMMARY

Systems and methods in accordance with various embodiments of the present disclosure may overcome one or more of the aforementioned and other deficiencies experienced in conventional approaches to machine learning orchestration. In particular, embodiments described herein provide orchestrated multi-model processing that generate structured signals from multimodal inputs, coordinate outputs from domain-specific and generalized models, and apply arbitration and feedback integration to produce synthesized responses.

For example, multimodal input data including text, audio, video, or gesture streams is received. The multimodal input data is normalized into a common representation format, features are extracted, and the features are aligned to a temporal index. The aligned features are propagated into a schema-conformant representation to generate structured signals suitable for further processing.

The structured signals can be distributed to multiple specialized learner models, each comprising a small language model trained for domain-specific reasoning. In an embodiment, each specialized learner model independently executes against the structured signals to generate a domain-specific output with an associated confidence value. Concurrently, the structured signals can be processed by a large language model agent configured for generalized reasoning to generate a generalized output. As used herein, the term "specialized learner model" refers to a small language model trained for reasoning within a defined domain scope. The term "generalized output" refers to an inference result generated by a large language model agent configured without domain-specific restrictions.

In accordance with various embodiments, arbitration logic resolves conflicts between the domain-specific outputs and the generalized output. In an embodiment, arbitration includes retrieving confidence values, applying domain-specific weighting coefficients, and computing recency-of-evidence scores from curated datasets. The arbitration logic combines these measures to assign priorities and generates arbitration results based on ranking or composite output formation. The term "arbitration logic" refers to machine-executed processes that compare multiple predictive outputs, assign priorities, and generate arbitration results based on weighted measures and integrated signals.

Curated dataset inputs and validation feedback are integrated into the arbitration results. This integration includes retrieving external records via an application programming interface, validating record integrity with cryptographic checks, transforming records to a schema-conformant representation, and normalizing correction signals from external feedback interfaces. Updates to arbitration weights, interrogation constraints, and model parameters are performed using the transformed records and normalized correction signals.

A synthesized response is generated using the arbitration results, the curated dataset inputs, and the validation feedback. The synthesized response may include text, audio, or avatar-based outputs. In certain embodiments, audio and visual directives are mapped to viseme and gesture cues, time-aligned, and used to generate avatar-based outputs synchronized with the synthesized response.

In accordance with various embodiments, the disclosed systems provide a structured framework for schema-conformant normalization across multimodal streams, ensuring structured signal generation and interoperability across system modules. The arbitration framework applies parameterized conflict resolution across domain-specific and generalized outputs, including confidence weighting and recency scoring, to enforce deterministic selection or composite synthesis. Integration of curated datasets and validation feedback introduces a dynamic adjustment cycle that modifies arbitration parameters and model behavior in a reproducible, auditable manner.

In certain embodiments, the disclosed systems may be applied as a guided venture development platform that adapts to a founder's experience, goals, and behavioral profile. For example, multimodal inputs such as spoken ideas, typed notes, or gesture-based interactions can be captured and structured, then routed to specialized learner modules trained for domains including legal strategy, fundraising, partnerships, and market development. A Butler agent performs generalized reasoning to complement the domain-specific modules, while arbitration logic resolves conflicts and incorporates curated datasets and validation feedback. Synthesized responses may be delivered as text, audio dialogue, or avatar-based interactive guidance operable to interrogate inputs, surface contradictions, and provide structured prompts, guiding the founder from early concept validation through pilot planning, go-to-market execution, and scaling strategies.

Although described in connection with multimodal conversational processing, the disclosed systems may be applied to other technical domains where coordinated reasoning is required across multiple specialized and generalized models. Examples include compliance auditing, healthcare diagnostics, geospatial analysis, and logistics planning, each of which involves multimodal inputs, domain-specific knowledge, and the need for arbitration and validation integration.

Various other functions and advantages are described and suggested below as may be provided in accordance with the various embodiments.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
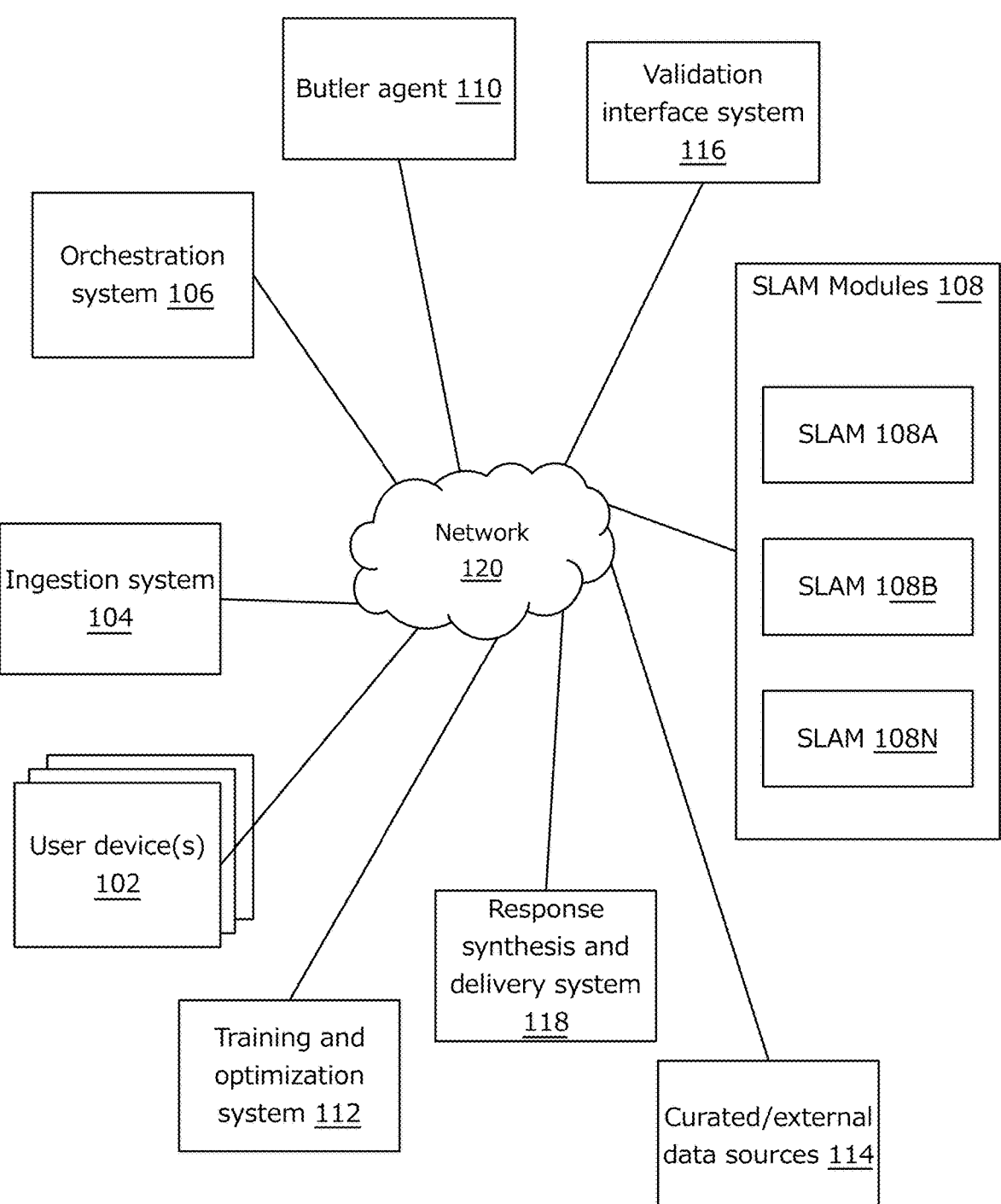
FIG. 1 illustrates an example system architecture for orchestrated multi-model processing and response generation in accordance with various embodiments.

The embodiments described herein relate to systems and methods for orchestrated multi-model processing and synthesized response generation using multimodal input data. The system is operable to receive text, audio, video, and gesture streams, normalize and align features across modalities, generate structured signals, and distribute those signals across multiple specialized learner models and a large language model agent. In various embodiments, the system includes components for multimodal ingestion, schema-conformant signal generation, domain-specific and generalized model execution, arbitration of predictive outputs, integration of curated datasets and validation feedback, and synthesis of multimodal responses. The system processes multimodal data inputs, applies schema normalization and arbitration logic, and executes response synthesis into text, audio, and digital personal display outputs (e.g., voice, video, gesture-responsive agents, and bi-directional text-speech transformations). In certain embodiments, the system integrates interrogation logic, memory and context management, and adaptive feedback loops, ensuring a scalable and interoperable framework for orchestrated multi-model reasoning.

In certain embodiments, the disclosed systems and methods may be applied as a guided venture development platform that adapts to a founder's behavioral profile, goals, and stage of development. Multimodal inputs may include spoken ideas captured as audio streams, typed notes entered through user interfaces, uploaded video clips describing a concept, or gesture-based interactions performed through wearable or Internet-of-Things (IoT)-enabled devices configured to capture movement, environmental context, or biometric cues. These inputs are transformed into structured signals and distributed across specialized learner modules trained for venture-building domains such as legal structuring, fundraising strategy, partnership development, marketing, social impact, or technical product planning, together with a Butler agent that performs generalized reasoning. Arbitration logic reconciles predictive outputs by applying confidence scoring, domain-specific weighting, and recency-of-evidence evaluation, while curated venture datasets and validation feedback from mentors, experts, or reviewers are integrated to refine arbitration results. Synthesized responses may be delivered to the founder or end user as text, spoken dialogue, or through a digital personal display (e.g., voice, video, gesture-responsive embodiment, or bi-directional text-to-speech and speech-to-text transformations) that provides interactive guidance and contextual adaptation. In operation, these orchestrated interactions enable iterative progression from idea validation to pilot planning, go-to-market execution, and scaling strategies.

In certain embodiments, the disclosed orchestration architecture may integrate with Internet-of-Things (IoT) devices and wearable sensors to enable context-aware and physiologically adaptive operation. For example, multimodal sensor inputs—including heart rate, galvanic skin response (GSR), electroencephalography (EEG), and eye-tracking signals—can be received through IoT-enabled wearable devices. The system may employ a multi-protocol communication layer that supports WebSocket, HTTP/2, MQTT, and CoAP protocols, allowing the orchestration system 106 to dynamically select or switch communication protocols based on sensor type, data priority, network conditions, or available device power. In some embodiments, arbitration logic applies weighted protocol scoring to optimize data throughput, latency, and energy consumption, enabling adaptive bandwidth management such as protocol switching when network bandwidth or battery level thresholds are reached.

In another embodiment, sensor fusion data is preprocessed on the wearable device to filter noise and extract key features prior to transmission. The extracted features are transmitted to edge servers for additional transformation and to orchestration system 106 for higher-order reasoning. This distributed processing approach may achieve 80-90% bandwidth reduction by transmitting feature vectors instead of raw data streams while maintaining real-time responsiveness. For example, biometric engagement levels may be analyzed to drive avatar-based or digital embodiment adaptation, such as adjusting vocal tone, gesture timing, or pacing of interactive guidance. System latency between biometric event detection and response synthesis can, in some configurations, be maintained under 200 milliseconds through WebSocket-based event routing and schema-conformant state management.

In certain implementations, these techniques enable a contextually adaptive entrepreneurial training environment, where physiological and behavioral cues inform the pacing, tone, and modality of system guidance. The integration of IoT-based sensor fusion and multi-protocol orchestration thus extends the core architecture to support physiologically adaptive user experiences while remaining within the same multi-model orchestration and arbitration framework described herein.

Although described in connection with guided venture development, the disclosed systems may also be applied in other technical domains where coordinated reasoning is required across multiple specialized and generalized models. Examples include compliance auditing, healthcare diagnostics, geospatial analysis, and logistics planning, each of which involves multimodal inputs, domain-specific knowledge, and the need for arbitration and validation integration.
Conceptual Architecture FIG. 1 illustrates an exemplary embodiment of a system architecture for orchestrated multi-model interaction and response generation, in accordance with various embodiments. As shown, the system includes user device(s) 102, ingestion system 104, orchestration system 106, specialized learner modules (SLAMs 108), Butler agent 110, training and optimization system 112, curated/external data sources 114, validation interface system 116, and response synthesis and delivery system 118, interconnected over network 120. Each component is operable to process multimodal input data, generate predictive outputs through coordinated model execution, incorporate curated datasets and validation feedback, and synthesize responses for delivery to user device(s).

The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

In operation, user device(s) 102 capture multimodal inputs such as text, audio, video, or gesture data and transmit the inputs to ingestion system 104. Ingestion system 104 structures the received signals for processing and provides them to orchestration system 106. Orchestration system 106 is operable to coordinate interactions among specialized learner modules 108, butler agent 110, curated/external data sources 114, and validation interface system 116 to generate predictive outputs and manage task routing. Training and optimization system 112 updates parameters for specialized learner modules 108 and butler agent 110 based on curated datasets and validation inputs, enabling orchestration system 106 to incorporate updated models during execution. Response synthesis and delivery system 118 composes outputs in text, audio, or digital personal display outputs (e.g., voice, video, gesture-responsive agents, and bi-directional text-speech transformations) form and returns the results to user device(s) 102 through network 120.

User device(s) 102 comprise one or more network-connected computing devices operable to render interface components for interacting with multimodal inputs and synthesized response outputs. User device(s) 102 may include smartphones, tablets, laptops, desktop computers, servers, smart goggles, smart glasses, wearable devices, or other computing devices configured to execute native or browser-based applications that communicate with the systems described herein. Through these interfaces, users may submit text entries, voice inputs, gesture commands, or video streams, and may receive synthesized outputs presented as text, audio, or digital personal display (e.g., voice, video, gesture-responsive agents, and bi-directional text-speech transformations) responses generated by response synthesis and delivery system 118. In certain embodiments, user device(s) 102 display model-generated prompts, transmit user-provided responses, and render outputs synchronized across multiple modalities.

User device(s) 102 include, generally, a computing device with functionality for communicating remotely over network 120. Each user device may execute one or more applications, such as a web browser (e.g., Microsoft Edge, Google Chrome, Mozilla Firefox, Apple Safari) or a dedicated application configured to capture multimodal inputs and render synthesized outputs transmitted by orchestration system 106 or response synthesis and delivery system 118. In particular embodiments, a user device may include hardware, software, or embedded logic components, or combinations thereof, operable to carry out the functions supported by the system.

In operation, user device(s) 102 may render interfaces for capturing multimodal input data, transmit structured or unstructured input signals over network 120, and receive synthesized outputs for display or playback. For example, a user may provide a spoken query accompanied by a hand gesture captured through a device's microphone and camera, or may submit contextual instructions using a wearable display. The device transmits the captured data over network 120 for ingestion and orchestration, and the synthesized response is returned and rendered as synchronized text, audio, or digital personal display outputs (e.g., voice, video, gesture-responsive agents, and bi-directional text-speech transformations). In certain embodiments, users employ these devices within practical, domain-specific workflows such as healthcare diagnostics, compliance auditing, logistics planning, or other decision-support contexts, where multimodal interactions enable coordinated reasoning across specialized and generalized models.

Ingestion system 104 is operable to receive multimodal input data from user device(s) 102 and generate structured signals suitable for further processing. More specifically, ingestion system 104 receives heterogeneous inputs comprising one or more of text data, audio data, video data, or gesture data, and normalizes these inputs into a common representation format. As used herein, the term "multimodal input data" refers to electronic data streams of varying types including natural language text, digitized audio signals, video frame sequences, and gesture vectors derived from sensors such as accelerometers or vision-based tracking. The term "structured signal" refers to a schema-conformant representation of the multimodal input data that preserves semantic and temporal alignment across modalities.

In one embodiment, ingestion system 104 applies preprocessing logic to convert each modality into a format suitable for cross-modal alignment. For example, ingestion system 104 may apply speech-to-text conversion to transform audio input into tokenized linguistic features, or may apply optical character recognition (OCR) to extract text from an uploaded video frame. In another example, ingestion system 104 may extract keyframes from video and generate frame descriptors using convolutional feature maps, or compute gesture vectors from depth-camera data to encode directional movements. These modality-specific transformations produce normalized representations that can be mapped to a common temporal index.

In certain embodiments, ingestion system 104 is further operable to generate temporally aligned features by mapping normalized modality streams to a shared timeline. For example, ingestion system 104 may align audio-derived tokens with video frame descriptors based on timestamps or clock-synchronized metadata, ensuring that gestures captured at a particular frame are temporally consistent with co-occurring spoken words. The aligned features are then propagated into a schema-conformant representation, which may comprise a structured feature graph encoding linguistic tokens, audio embeddings, video frame descriptors, and gesture vectors as nodes with temporal and semantic relationships defined as edges.

In operation, ingestion system 104 generates structured signals conformant to the schema-conformant representation, enabling subsequent processing by orchestration system 106. For example, ingestion system 104 may receive a user query consisting of spoken audio accompanied by a pointing gesture captured on video. The system extracts linguistic tokens from the audio, computes gesture vectors from the video, aligns both features to a common timeline, and generates structured signals that encode both the semantic content of the query and the physical context indicated by the gesture. These structured signals are then transmitted over network 120 to orchestration system 106 for coordinated multi-model execution.

In certain embodiments, ingestion system 104 further tags structured signals with session-level identifiers to enable orchestration system 106 to group related user interactions into a common workflow. In another embodiment, ingestion system 104 maintains intake records for each input instance, enabling traceability, reproducibility, and validation during arbitration or feedback integration stages. Additional details of structured signal processing and orchestration integration are described with reference to FIG. 2 below.

Orchestration system 106 is operable to coordinate execution of specialized learner modules 108 and a large language model agent, e.g., Butler agent 110, using structured signals generated by ingestion system 104. More specifically, orchestration system 106 receives structured signals conformant to a schema representation, distributes the structured signals to a plurality of specialized learner modules 108, executes each specialized learner module 108 to generate respective domain-specific outputs, executes Butler agent 110 (e.g., a large language model agent) to generate a generalized output, and applies arbitration logic to resolve conflicts among the domain-specific outputs and the generalized output. Arbitration results are generated, curated dataset inputs and validation feedback are integrated, and a synthesized response is produced for transmission to user device(s) 102 via response synthesis and delivery system 118.

In one embodiment, orchestration system 106 includes a signal distribution module operable to select a subset of specialized learner modules 108 based on workflow context, domain indicators, or persona activation state. For example, when structured signals indicate financial terms, orchestration system 106 may distribute the structured signals to a finance-domain learner module, a compliance-domain learner module, and the generalized Butler agent 110 (e.g., a large language model agent). Distribution is implemented through message queues keyed by task identifiers, ensuring that each learner module receives schema-conformant structured signals in parallel with consistent session context.

Orchestration system 106 further includes arbitration logic operable to resolve conflicts between outputs generated by specialized learner modules 108 and Butler agent 110 (e.g., a large language model agent). In an embodiment, arbitration logic computes confidence values supplied by each learner module, applies domain-specific weighting coefficients, and derives recency-of-evidence scores from curated dataset inputs 114. These measures are combined using weighted aggregation algorithms to assign priorities. For example, when a healthcare-domain learner module produces an output contradicting a generalized output from Butler agent 110 (e.g., a large language model agent), orchestration system 106 may prioritize the healthcare-domain output if its confidence value is high, its weighting coefficient is elevated for clinical accuracy, and the curated dataset inputs include recent medical reference records.

Arbitration results are then ranked, and either a top-ranked output or a composite output is selected.

In certain embodiments, orchestration system 106 applies memory and context logic to preserve workflow history and continuity across multi-turn interactions. For example, orchestration system 106 may maintain a per-session state store keyed by track and persona identifiers, recording a time-ordered sequence of prior inputs and outputs. During arbitration, orchestration system 106 retrieves context payloads comprising summary vectors, active persona identifiers, and dependency-graph metadata, ensuring that arbitration results reflect both historical state and present input. This enables orchestration system 106 to maintain continuity across extended reasoning tasks.

Orchestration system 106 is further operable to apply interrogation logic to evaluate predictive outputs generated by specialized learner modules 108 and Butler agent 110 (e.g., a large language model agent). In an embodiment, interrogation logic performs contradiction tests between candidate outputs to detect inconsistencies, performs coverage analysis against requirement schemas to identify unfulfilled fields or unsatisfied constraints, and generates interrogation prompts when such contradictions or gaps are detected. For example, if one learner module predicts a numerical value and another omits the field, orchestration system 106 may emit a prompt requesting clarification of the missing value, log the prompt in validation interface system 116, and incorporate any responses received.

In another embodiment, orchestration system 106 integrates curated dataset inputs 114 and validation feedback from validation interface system 116 into arbitration results. Integration includes retrieving external records via application programming interfaces, validating integrity with cryptographic hash checks, transforming external records into schema-conformant representations, and normalizing correction signals from user responses into machine-readable feedback. These dataset and feedback integrations may update arbitration weights, interrogation constraints, or registered model parameters for specialized learner modules 108 and Butler agent 110 (e.g., a large language model agent).

In operation, orchestration system 106 produces synthesized responses by combining arbitration results with curated dataset inputs and validation feedback. Synthesized responses may include text, audio, or digital personal display outputs (e.g., voice, video, gesture-responsive agents, and bi-directional text-speech transformations). For example, orchestration system 106 may generate a text answer to a user query, an audio narration of that answer, or an digital personal display output synchronized with viseme and gesture cues. The synthesized response is transmitted via response synthesis and delivery system 118 for presentation on user device(s) 102.

Orchestration system 106 communicates with training and optimization system 112 to update model parameters, arbitration weights, and interrogation rules over time. For example, validation feedback indicating persistent misclassification may trigger retraining of a specialized learner module, while curated dataset updates may shift weighting coefficients applied in arbitration. In this way, orchestration system 106 ensures iterative refinement of arbitration processes and adaptive alignment of outputs with validated external records. Additional details of orchestration system 106 and its subcomponents are described in FIG. 2 below.

Specialized learner modules (SLAMs 108) are operable to process structured signals received from orchestration system 106 and generate predictive outputs specific to defined domain contexts. More specifically, each SLAM 108 comprises a small language model trained for reasoning within a bounded subject domain, such as finance, healthcare, compliance, or geospatial analysis. Orchestration system 106 distributes structured signals to multiple SLAMs 108, which may include SLAM 108A, SLAM 108B, and SLAM 108N, where "N" represents the Nth specialized learner module in the system. The designation of SLAM 108A, 108B, and 108N is provided for illustrative purposes only, and any number of SLAMs 108 may be instantiated depending on implementation requirements. Each SLAM 108 executes independently to produce a domain-specific output associated with a respective confidence value.

As illustrated in FIG. 1, SLAMs 108 may include SLAM 108A, SLAM 108B, and SLAM 108N, where "N" represents the Nth specialized learner module. The identification of SLAM 108A, SLAM 108B, and SLAM 108N is provided for illustrative purposes only. Any number of SLAMs 108 may be instantiated in a given deployment, and additional SLAMs may be trained and integrated without altering orchestration system 106 or other system components. In certain embodiments, orchestration system 106 selects a subset of SLAMs 108 for execution based on workflow context, domain indicators, or persona activation state, ensuring that only relevant SLAMs 108 are executed for a particular input.

In operation, SLAMs 108 receive temporally aligned, schema-conformant structured signals and perform tokenization, embedding generation, or parameterized inference instructions appropriate to the domain for which each SLAM is trained. For example, in a healthcare embodiment, a SLAM may process structured inputs derived from patient audio, video, and textual history to generate a diagnostic suggestion with an associated confidence score. In a compliance embodiment, a SLAM may evaluate structured text extracted from contracts to identify unfulfilled schema fields or mismatched clause conditions.

Each SLAM 108 communicates its predictive outputs to orchestration system 106, which applies arbitration logic to reconcile conflicts among the domain-specific outputs and generalized output produced by Butler agent 110. In certain embodiments, SLAMs 108 also receive updated parameters or interrogation constraints from training and optimization system 112, allowing outputs to adapt based on curated dataset inputs or validation feedback. This architecture supports iterative refinement across multiple executions while maintaining modularity and schema compliance.

Additional details of SLAMs 108, including interfaces for receiving structured signals, generating predictive outputs, and returning outputs with confidence values, are described in FIG. 3 below.

Butler agent 110 is operable to process structured signals received from orchestration system 106 and to generate a generalized output based on broad-domain reasoning. More specifically, Butler agent 110 comprises a large language model configured for generalized processing across heterogeneous subject matter. Unlike specialized learner modules 108, which are trained for bounded domain reasoning, Butler agent 110 executes parameterized inference requests that are not constrained to a specific subject domain. The generalized output generated by Butler agent 110 includes both a candidate response and an internal confidence score.

In certain embodiments, Butler agent 110 serves as the initial reasoning interface between user device(s) 102 and orchestration system 106. Butler agent 110 receives multimodal input signals normalized by ingestion system 104 and initiates preliminary reasoning to identify task intent, domain relevance, and processing scope. The identified task profile is transmitted to orchestration system 106 for agentic handoff, enabling orchestration system 106 to delegate specific reasoning tasks to one or more specialized learner modules 108 through SLAM/Butler interface 204. This arrangement allows Butler agent 110 to function as both a first point of interaction with the user and a generalized reasoning controller that dynamically coordinates with orchestration system 106 during task execution.

In operation, Butler agent 110 receives structured signals that have been normalized and propagated into a schema-conformant representation by ingestion system 104. Butler agent 110 processes these signals by applying tokenization, embedding generation, and inference instructions to produce candidate outputs that encompass a wide range of interpretive or reasoning pathways. For example, given structured signals derived from multimodal user input including audio, text, and gesture, Butler agent 110 may generate a generalized explanation of intent, propose a next-step recommendation, or produce an interpretive synthesis of multiple input types.

Butler agent 110 is further operable to provide arbitration-support metadata to orchestration system 106. Such metadata may include token-level attention distributions, hidden-state embeddings, or alignment vectors generated during inference. This information is passed alongside the generalized output to facilitate arbitration logic executed by orchestration system 106. By supplying both the generalized output and associated metadata, Butler agent 110 enables orchestration system 106 to compare domain-specific outputs from SLAMs 108 against generalized reasoning pathways in a structured manner.

In certain embodiments, Butler agent 110 is updated through training and optimization system 112. Curated datasets and validation feedback may be applied to refine parameter weights, interrogation constraints, or arbitration-support metadata. For example, when Butler agent 110 repeatedly produces generalized outputs that contradict high-confidence SLAM outputs validated by curated/external data sources 114, the parameter update logic of training and optimization system 112 may adjust Butler agent 110 to reduce false conflicts in subsequent inference cycles.

The generalized outputs generated by Butler agent 110 are communicated to orchestration system 106, which applies arbitration logic to reconcile conflicts among the generalized outputs and the domain-specific outputs generated by SLAMs 108.

Training and optimization system 112 is operable to update parameters of specialized learner modules 108 and Butler agent 110 based on curated dataset inputs and validation feedback. More specifically, training and optimization system 112 executes machine-level processes to (i) retrieve curated datasets from curated/external data sources 114, (ii) validate integrity of the datasets using cryptographic checks or schema conformity tests, (iii) integrate correction signals received via validation interface system 116, and (iv) apply parameter update instructions to the models under coordination of orchestration system 106.

In an embodiment, training and optimization system 112 implements multiple training pipelines, each comprising dataset ingestion, preprocessing, labeling, and feature alignment stages. For example, a curated dataset of domain-specific text interactions may be transformed into schema-conformant training records by applying tokenization, embedding generation, and metadata propagation. These training records are then used to adjust the weights of a corresponding SLAM 108. In another example, correction signals from validation interface system 116 may be converted into machine-readable update vectors that modify interrogation constraints or arbitration weight coefficients used during orchestration.

Training and optimization system 112 further applies optimization logic to coordinate updates across SLAMs 108 and Butler agent 110. Optimization logic may include reinforcement scheduling, loss reweighting across domain-specific and generalized models, or adaptive adjustment of recency-of-evidence scoring thresholds. For instance, if arbitration consistently favors a generalized output over multiple domain-specific outputs in the presence of high-confidence curated data, optimization logic may adjust weighting coefficients to reduce such bias in subsequent arbitration cycles.

In certain embodiments, training and optimization system 112 maintains a model parameter datastore that records prior parameter states, update vectors, and associated performance metrics. This datastore enables rollback, checkpointing, and comparative evaluation of retrained models. For example, after applying a set of parameter updates, the system may run parallel inference cycles using prior and updated versions of a SLAM 108, comparing predictive accuracy against validation feedback to determine whether the update improves system performance.

Training and optimization system 112 communicates directly with orchestration system 106 to supply updated arbitration weights, interrogation rules, and model confidence calibrations. By closing the loop between arbitration outcomes, curated dataset integration, and parameter updates, training and optimization system 112 establishes a continuous improvement cycle that adapts the multi-model architecture to evolving data distributions and validation signals.

In certain embodiments, training and optimization system 112 incorporates a human-in-the-loop expert training protocol to refine domain-specific models and improve predictive quality across specialized learner modules 108. This protocol supplements automated validation feedback by introducing expert-curated dataset augmentation, expert-reviewed labeling, and guided reinforcement cycles conducted by qualified subject-matter contributors. For example, during retraining of a fundraising or legal reasoning SLAM 108, domain experts may review representative training records, verify model interpretations, and annotate corrective examples that are then encoded as structured update vectors. These human-verified annotations are integrated into the supervised learning stage, allowing training and optimization system 112 to calibrate weighting functions and interrogation constraints based on verified domain expertise. This process enhances model alignment with verified professional knowledge while preserving machine-executed reproducibility across retraining iterations.

Curated/external data sources 114 are operable to supply reference data, training records, and validation materials for use by orchestration system 106, training and optimization system 112, and validation interface system 116. More specifically, curated/external data sources 114 comprise structured repositories, application programming interfaces (APIs), and partner-managed datasets that provide contextual records in a schema-conformant format. As used herein, "curated dataset inputs" refer to externally maintained datasets that have been pre-verified, annotated, or otherwise conditioned for use in machine-executed training and arbitration processes.

In an embodiment, curated/external data sources 114 provide domain-specific corpora such as technical manuals, compliance frameworks, or industry-standard ontologies. For example, a curated dataset may contain structured definitions of medical terminology or financial instrument classifications. When retrieved by training and optimization system 112, these datasets undergo cryptographic integrity checks and schema transformation to align with the system's internal representations. Orchestration system 106 may query curated/external data sources 114 in real time via APIs to retrieve reference records that inform arbitration logic, such as selecting between conflicting outputs from SLAMs 108 and Butler agent 110.

Curated/external data sources 114 are further operable to support feedback integration workflows. Validation interface system 116 may embed correction signals, user-labeled annotations, or expert-generated reference records back into curated/external data sources 114. For example, if a SLAM 108 produces a domain-specific output that conflicts with curated medical guidelines, validation interface system 116 may generate a correction signal that is normalized to the same schema and stored in curated/external data sources 114 for future retrieval.

In certain embodiments, curated/external data sources 114 include streaming or periodically refreshed feeds that deliver time-sensitive contextual data. For instance, a compliance-oriented SLAM 108 may rely on curated/external data sources 114 to access daily regulatory updates, while Butler agent 110 may reference curated knowledge graphs to verify generalized outputs. The combination of static curated datasets and dynamic external feeds allows arbitration logic to integrate both stable reference knowledge and rapidly changing contextual information.

Curated/external data sources 114 exchange data with training and optimization system 112 through authenticated, encrypted channels to ensure integrity of transferred records. Retrieved reference records, correction signals, and schema-conformant transformations are logged for auditability, enabling consistent re-use in subsequent training or arbitration cycles. By supporting schema enforcement, cryptographic validation, and dynamic retrieval, curated/external data sources 114 ensure that the multi-model system operates with validated, interoperable contextual inputs.

Validation interface system 116 is operable to capture, normalize, and integrate validation feedback signals provided by human reviewers or external verification services. In certain embodiments, validation interface system 116 implements a human-in-the-loop mechanism, wherein a human reviewer provides corrective input on outputs produced by SLAMs 108 or Butler agent 110. As used herein, such corrective input is transformed into a "correction signal," which refers to machine-readable data specifying whether a predictive output should be accepted, rejected, or modified according to reference standards or domain-specific criteria.

Validation interface system 116 executes multiple processes to convert raw reviewer input into structured validation feedback. For example, when a reviewer flags a contradiction between a SLAM output and a curated dataset, validation interface system 116 records the correction, applies schema normalization to align it with internal representations, and generates a parameter update vector that can be processed by training and optimization system 112. In certain embodiments, validation interface system 116 further applies confidence calibration logic, assigning confidence scores to correction signals based on reviewer expertise, session metadata, or corroboration with curated/external data sources 114.

In an embodiment, validation interface system 116 operates in real-time orchestration cycles. When orchestration system 106 detects conflicting outputs among SLAMs 108 and Butler agent 110, validation interface system 116 may issue interrogation prompts to a reviewer, capture the reviewer's response, and immediately normalize the response into validation feedback. This validation feedback is incorporated into arbitration results, ensuring that synthesized responses reflect authoritative corrections.

Validation interface system 116 is further operable to support iterative model refinement. Correction signals are logged into a validation datastore, enabling recurring analysis of common error patterns across SLAMs 108 and Butler agent 110. Training and optimization system 112 retrieves these stored signals during parameter updates, adjusting interrogation constraints, arbitration weights, or model parameters to reduce recurrence of validated errors. For example, repeated corrections related to incomplete schema coverage may trigger training and optimization system 112 to extend SLAM training corpora with curated datasets addressing those schema fields.

In certain embodiments, validation interface system 116 may also coordinate with expert review portals used during the human-in-the-loop training protocol described in connection with training and optimization system 112. This coordination enables expert reviewers to provide structured feedback and annotations through the same validation pipeline, allowing their inputs to be captured as correction signals and propagated into subsequent model update cycles.

Validation interface system 116 exchanges data with orchestration system 106, curated/external data sources 114, and training and optimization system 112 through authenticated protocols. Each validation event is logged with provenance metadata, including session identifiers, reviewer roles, and timestamped correction content. By enabling structured capture, normalization, and integration of validation feedback through a human-in-the-loop mechanism, validation interface system 116 establishes a machine-readable interface for corrective input, closing the feedback loop required for adaptive arbitration and model optimization.

Response synthesis and delivery system 118 is operable to generate and transmit synthesized responses for presentation to user device(s) 102. More specifically, response synthesis and delivery system 118 integrates arbitration results, curated dataset inputs, and validation feedback into a machine-generated output that conforms to one or more delivery modalities, including text, audio, or digital personal display presentations. As used herein, a "synthesized response" refers to an output generated by combining arbitration results with integrated correction signals and schema-conformant reference data to produce an actionable, machine-readable communication.

In an embodiment, response synthesis and delivery system 118 executes a multi-stage synthesis pipeline. First, arbitration results generated by orchestration system 106 are normalized into an intermediate representation comprising ranked or composite predictive outputs. Second, curated dataset inputs retrieved via curated/external data sources 114 and validation feedback from validation interface system 116 are applied as constraint layers that modify or annotate the intermediate representation. Third, response synthesis and delivery system 118 executes response generation logic, which converts the intermediate representation into a final synthesized response according to modality-specific encoding requirements.

For example, in a text-based output modality, response synthesis and delivery system 118 may generate a structured paragraph response by concatenating validated content segments with token-level provenance metadata that preserves traceability to individual SLAM 108 outputs. In an audio modality, the system may generate speech waveforms from the same structured content using a text-to-speech module, aligning phoneme sequences with prosodic annotations derived from arbitration metadata. In a digital personal display modality, response synthesis and delivery system 118 may generate synchronized visual and auditory behavior by mapping token sequences to viseme trajectories or gesture vectors, ensuring time alignment between audio and animation tracks.

Response synthesis and delivery system 118 is further operable to support real-time delivery. In certain embodiments, arbitration results are streamed to the response synthesis and delivery system 118 in segments, allowing partial synthesis and progressive rendering on user device(s) 102. For instance, the system may stream a textual outline while simultaneously preparing synchronized audio output. This enables multimodal presentation without requiring orchestration system 106 to complete an entire arbitration cycle before delivery begins.

In addition, response synthesis and delivery system 118 maintains a delivery log datastore recording synthesized response content, provenance metadata, and modality-specific directives. This datastore provides an auditable record of each generated response, allowing training and optimization system 112 to evaluate synthesis quality and adapt response generation logic. For example, repeated validation feedback indicating misaligned digital personal display gestures may trigger updates to viseme mapping tables used in subsequent synthesis cycles.

By integrating arbitration results, curated dataset inputs, and validation feedback into a structured response pipeline, response synthesis and delivery system 118 provides for coordinated multi-model processing. The synthesized responses generated by response synthesis and delivery system 118 are communicated over network 120 to user device(s) 102 for interactive presentation and subsequent user engagement.

Network 120 generally represents a network or collection of networks, such as the Internet, a corporate intranet, or a combination of both, over which the various components illustrated in FIG. 1 communicate and interact. In various embodiments, network 120 may be implemented as an intranet, an extranet, a virtual private network (VPN), a local area network (LAN), a wireless LAN (WLAN), a wide area network (WAN), a metropolitan area network (MAN), a portion of the Internet, or any combination thereof. One or more links connect user device(s) 102, ingestion system 104, orchestration system 106, specialized learner modules 108, Butler agent 110, training and optimization system 112, curated/external data sources 114, validation interface system 116, and response synthesis and delivery system 118 to network 120. The links may include wired, wireless, or optical connections.

Network 120 facilitates communication among the computing devices and systems referenced herein, enabling the transfer of multimodal input data, structured signals, predictive outputs, arbitration results, curated dataset records, validation feedback, and synthesized response directives. In certain embodiments, communication between components occurs over secure channels using authenticated protocols, preserving message integrity and state across distributed deployments.

One or more links couple systems, services, or user devices to network 120. These links may include cloud-based application programming interfaces (APIs), secure HTTPS connections, socket communication, or other communication protocols. In various embodiments, system components may be deployed on unitary servers, distributed across multiple physical machines, or containerized in virtualized cloud environments. System modules may execute on hardware, software, or combinations thereof, and may interoperate with one another across private deployments or public cloud infrastructures.

In certain implementations, one or more data storages may be communicatively linked to network 120. Data storage may persist multimodal input data, structured signal representations, predictive outputs, arbitration weights, validation logs, and synthesized response artifacts. Storage systems may be implemented as relational databases, document stores, or vector-based datastores. In an embodiment, orchestration system 106 and training and optimization system 112 access and modify information stored in these datastores to coordinate execution, update parameters, or retrain specialized learner models and the large language model agent.

The system may also include additional subsystems and databases not illustrated in FIG. 1 but understood by a person of ordinary skill in the art. For example, the system may include one or more databases for storing multimodal input data, normalized feature streams, structured signals, predictive outputs, validation feedback records, arbitration results, synthesized responses, and trained model artifacts. In certain embodiments, these data stores may include structured relational databases, unstructured document stores, or vector-based repositories used during runtime inference or training workflows. The agents referenced above—including specialized learner modules (SLAMs 108), Butler agent 110, and response synthesis and delivery system 118—may be deployed on separate servers, executed asynchronously, or trained either independently or as part of a coordinated pipeline. Similarly, orchestration system 106 and training and optimization system 112 may operate as distributed services across cloud or edge infrastructure. Other databases, components, or orchestration services may be added or modified as needed to support particular deployment contexts, integration workflows, or compliance requirements, all without departing from the scope of the present disclosure.

In accordance with various embodiments, collectively, the components illustrated in FIG. 1 establish a coordinated architecture for orchestrated multi-model processing and response generation. User device(s) 102 and ingestion system 104 enable multimodal acquisition and normalization of user-provided inputs. Orchestration system 106 coordinates predictive outputs generated by specialized learner modules 108 and Butler agent 110, applying arbitration logic to resolve conflicts and integrate contextual measures. Training and optimization system 112, curated/external data sources 114, and validation interface system 116 form a feedback loop that provides curated records, correction signals, and parameter updates for adaptive refinement of model behavior. Response synthesis and delivery system 118 integrates arbitration results, curated datasets, and validation feedback to generate synthesized responses transmitted over network 120. In certain embodiments, the architecture ensures schema-conformant signal generation, structured arbitration, auditable validation feedback, and adaptive optimization, thereby providing a computer-implemented framework that improves reliability, interoperability, and auditability of coordinated reasoning across multiple machine learning models.

Orchestration System

Figure 2:
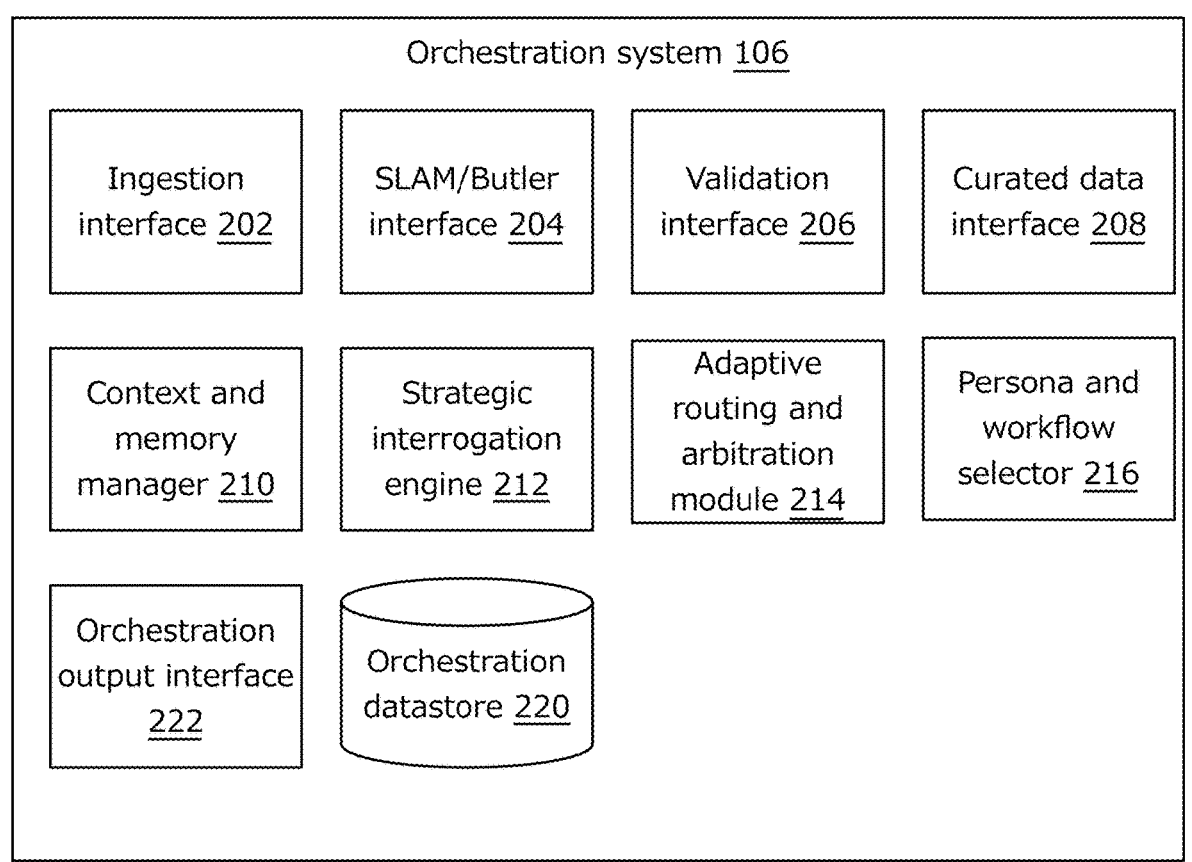
FIG. 2 illustrates an example architecture of orchestration system in accordance with various embodiments.

FIG. 2 illustrates an example architecture of orchestration system, in accordance with various embodiments. The components described herein are exemplary and provided for illustration. As shown, orchestration system 106 comprises ingestion interface 202, SLAM/Butler interface 204, validation interface 206, curated data interface 208, context and memory manager 210, strategic interrogation engine 212, adaptive routing and arbitration module 214, persona and workflow selector 216, orchestration datastore 220, and orchestration output interface 222. In certain embodiments, orchestration system 106 is also in communication with one or more databases configured to store orchestration logs, session checkpoints, and rollback states. The orchestration system 106 coordinates structured signal flow, model execution, arbitration processing, and feedback integration, providing a machine-executed control layer for multi-model interaction. Other system configurations may be used, as would be understood by a person of ordinary skill in the art, without departing from the scope of the disclosure.

It should be noted that although the databases are shown as separate databases, data from the databases may be maintained across fewer or additional databases depending on deployment configuration. The databases may be accessed by each of the various components of orchestration system 106 in order to perform the functionality of the corresponding component, and may also be accessed by other components, systems, or services described herein. In certain embodiments, orchestration system 106 may be hosted on multiple server computers and/or distributed across multiple computing environments, including cloud-based or containerized deployments. Additionally, the components described with respect to orchestration system 106 may be separated into distinct services or distributed across disparate systems while still collectively performing the functionality described.

In operation, in accordance with various embodiments, orchestration system 106 coordinates the reception, processing, and distribution of structured signals across multiple subcomponents. Ingestion interface 202 receives structured signals from ingestion system 104 and prepares them for orchestration workflows. SLAM/Butler interface 204 exchanges task instructions and context parameters with specialized learner modules 108 and Butler agent 110. Validation interface 206 incorporates correction signals from validation interface system 116, while curated data interface 208 retrieves reference records from curated/external data sources 114. Context and memory manager 210 maintains session-level state and continuity across orchestration cycles. Strategic interrogation engine 212 applies rule-based interrogation processes, including contradiction testing and clarification prompts. Adaptive routing and arbitration module 214 schedules execution of task requests and applies arbitration logic to resolve conflicts among predictive outputs. Persona and workflow selector 216 activates domain-specific personas and governs progression of multitrack workflows. Orchestration datastore 220 persists checkpoints, rollback states, and orchestration logs. Orchestration output interface 222 transmits orchestration results to response synthesis and delivery system 118 for presentation through user device(s) 102.

Ingestion interface 202 is operable to receive structured signals generated by ingestion system 104 and to prepare those signals for orchestration within orchestration system 106. More specifically, ingestion interface 202 establishes a schema-conformant handoff layer, ensuring that modality-normalized and temporally aligned features produced by ingestion system 104 are propagated into orchestration workflows without loss of structure or fidelity.

In an embodiment, ingestion interface 202 executes parsing logic to validate that incoming structured signals conform to expected schema definitions. This validation may include checking for the presence of required schema fields, confirming datatype assignments, and verifying timestamp synchronization across multimodal features. For example, if structured signals include linguistic tokens, audio embeddings, and gesture vectors, ingestion interface 202 validates that each element is properly indexed to a temporal alignment marker before admitting the signal into orchestration system 106.

In certain embodiments, ingestion interface 202 further applies preprocessing logic to enhance orchestration readiness. Such logic may include assigning session identifiers (e.g., universally unique identifier (UUID)), embedding provenance metadata, and compressing feature vectors for efficient routing. For example, ingestion interface 202 may embed a session identifier into each structured signal batch, enabling context and memory manager 210 to retrieve prior related signals during arbitration.

Ingestion interface 202 is also operable to handle error detection and recovery. If an input signal is incomplete or malformed, ingestion interface 202 may trigger a correction request to ingestion system 104 or generate a placeholder record flagged for interrogation by strategic interrogation engine 212. This ensures that orchestration system 106 maintains continuity even when specific schema fields are missing or delayed.

In operation, ingestion interface 202 communicates validated and annotated structured signals to SLAM/Butler interface 204 for distribution to specialized learner modules 108 and Butler agent 110. Provenance metadata propagated through ingestion interface 202 allows arbitration results generated by adaptive routing and arbitration module 214 to maintain traceability to the original multimodal input. By enforcing schema conformity, embedding metadata, and providing robust error handling, ingestion interface 202 establishes a technical bridge between ingestion system 104 and orchestration system 106 that ensures reliable multimodel coordination.

SLAM/Butler interface 204 establishes a bidirectional communication channel between orchestration system 106, Butler agent 110, and specialized learner modules 108 to support agentic task handoffs and coordination. The interface enables orchestration system 106 to direct structured reasoning tasks initiated by Butler agent 110 toward appropriate SLAMs 108 and, conversely, to return SLAM-generated outputs back to Butler agent 110 for synthesis or summarization. This coordination framework ensures continuity of reasoning and maintains schema alignment between generalized and domain-specific outputs across iterative orchestration cycles.

SLAM/Butler interface 204 is operable to distribute structured signals received from ingestion interface 202 to specialized learner modules 108 and Butler agent 110, and to collect predictive outputs generated by those models. More specifically, SLAM/Butler interface 204 provides a routing and coordination layer that directs schema-conformant signals toward domain-specific or generalized reasoning processes, ensuring that each execution cycle maintains alignment with orchestration requirements.

In an embodiment, SLAM/Butler interface 204 executes selection logic to determine which specialized learner modules 108 should be activated for a given session. This selection may be based on workflow context, persona activation state, or domain-specific indicators embedded in the structured signals. For example, when structured signals contain tokens associated with regulatory compliance, SLAM/Butler interface 204 may activate a compliance-oriented SLAM while suppressing unrelated modules. This functionality corresponds to orchestration claims involving the selection of a subset of SLAMs for execution.

SLAM/Butler interface 204 is further operable to manage parallel execution of selected specialized learner modules 108 alongside Butler agent 110. Structured signals are transmitted to each activated model, which independently generates domain-specific outputs or a generalized output. SLAM/Butler interface 204 then collects the resulting outputs along with associated metadata such as model confidence values, attention weights, or provenance identifiers. For example, a financial-analysis SLAM may output a structured risk assessment vector with a 0.87 confidence score, while Butler agent 110 outputs a generalized reasoning narrative tagged with token-level attention distributions.

In certain embodiments, SLAM/Butler interface 204 applies synchronization logic to align outputs generated by SLAMs 108 and Butler agent 110 with session state maintained by context and memory manager 210. This may include embedding session identifiers into collected outputs, ensuring that subsequent arbitration logic can associate results with prior workflow history. Additionally, SLAM/Butler interface 204 may perform lightweight preprocessing such as normalizing output formats across multiple SLAMs to a common arbitration schema before forwarding them to adaptive routing and arbitration module 214.

By coordinating signal distribution, model activation, output collection, and synchronization, SLAM/Butler interface 204 provides orchestration system 106 with a unified interface for multi-model execution. The predictive outputs and metadata collected through SLAM/Butler interface 204 serve as the input set upon which arbitration logic operates, directly supporting the system's multi-model coordination and conflict resolution functions.

Validation interface 206 is operable to exchange interrogation prompts and correction signals between orchestration system 106 and validation interface system 116 of FIG. 1. More specifically, validation interface 206 provides orchestration system 106 with a machine-readable channel for incorporating human-in-the-loop feedback into arbitration logic and synthesized response generation.

In an embodiment, validation interface 206 generates interrogation prompts in response to conflict detection events signaled by adaptive routing and arbitration module 214 or strategic interrogation engine 212. These interrogation prompts may include targeted queries derived from schema coverage analysis, contradiction tests, or incomplete slot values identified in predictive outputs. For example, when two SLAMs 108 generate conflicting risk classifications, validation interface 206 may issue a structured prompt requesting confirmation from a human reviewer.

Validation interface 206 is further operable to receive correction signals generated by validation interface system 116 in response to interrogation prompts. Correction signals are schema-normalized records specifying acceptance, rejection, or modification of predictive outputs, and may include reviewer metadata such as confidence annotations or timestamps. Validation interface 206 validates these correction signals, assigns session identifiers, and routes them into arbitration workflows executed by adaptive routing and arbitration module 214.

In certain embodiments, validation interface 206 provides immediate arbitration feedback. For instance, when a reviewer identifies that a SLAM output fails to satisfy a schema requirement, validation interface 206 injects the correction signal into the arbitration result set, enabling orchestration system 106 to override or adjust the output before synthesized response generation. In addition, validation interface 206 stores validated correction signals in orchestration datastore 220, enabling training and optimization system 112 to retrieve historical feedback for model parameter updates.

By enabling orchestration system 106 to issue interrogation prompts, capture human-in-the-loop corrections, and propagate normalized correction signals into arbitration and training processes, validation interface 206 provides a technical bridge that grounds real-time orchestration in validated feedback.

Curated data interface 208 is operable to retrieve curated dataset inputs from curated/external data sources 114 of FIG. 1 and to propagate the retrieved data into orchestration system 106 for use during arbitration and synthesis. More specifically, curated data interface 208 provides a machine-readable channel that validates, transforms, and normalizes externally sourced records so that they can be applied as weighted signals during conflict resolution and response generation.

In an embodiment, curated data interface 208 executes a multi-stage retrieval process. First, curated data interface 208 issues authenticated queries to curated/external data sources 114 using application programming interfaces (APIs) or secure data feeds. Second, it performs cryptographic hash verification or checksum validation to confirm record integrity. Third, curated data interface 208 transforms the retrieved records into schema-conformant representations, mapping field values into formats aligned with orchestration workflows. For example, a compliance dataset may be retrieved as a JSON file, verified by hash comparison, and then transformed into normalized field objects corresponding to regulatory rule identifiers.

Curated data interface 208 is further operable to assign provenance metadata to each retrieved record. Provenance metadata may include source identifiers, retrieval timestamps, and validation status. This metadata ensures that when adaptive routing and arbitration module 214 applies curated records to prioritize outputs, the decision path can be traced back to specific external datasets. For instance, if Butler agent 110 proposes a generalized recommendation and a SLAM 108 produces a conflicting domain-specific output, curated data interface 208 may retrieve an authoritative reference record that directly informs arbitration weighting.

In certain embodiments, curated data interface 208 also supports continuous or periodic refresh of contextual datasets. For example, curated data interface 208 may poll regulatory feeds daily, cache validated entries into orchestration datastore 220, and expose them to arbitration workflows. This ensures that orchestration system 106 operates with up-to-date curated records, particularly in domains where context changes frequently.

Accordingly, by retrieving curated datasets, validating record integrity, and enforcing schema conformity, curated data interface 208 integrates authoritative external records into arbitration and response synthesis processes.

Context and memory manager 210 is operable to maintain session continuity, workflow history, and persona context for orchestration system 106. More specifically, context and memory manager 210 records structured logs of multimodal inputs, predictive outputs, arbitration results, and validation feedback, enabling orchestration processes to preserve workflow history and apply context-driven parameters across execution cycles.

In an embodiment, context and memory manager 210 manages a per-session state store keyed by unique session identifiers. Each state store contains (i) a time-ordered sequence of prior inputs and outputs, (ii) an associated task-dependency graph, and (iii) active persona identifiers. For example, when a user engages across multiple input cycles, context and memory manager 210 links temporally aligned structured signals with predictive outputs, preserving dependencies that inform subsequent orchestration decisions.

Context and memory manager 210 is further operable to parameterize subsequent generation requests using state information. Parameterization may include generating a summary vector computed across the time-ordered sequence, retrieving the active persona identifier, and embedding dependency-graph metadata into orchestration payloads. For example, when arbitration logic requires selecting between a compliance-focused SLAM output and a Butler-generated narrative, context and memory manager 210 provides a summary vector of past compliance-related interactions and persona identifiers that indicate the user's context, thereby influencing arbitration weighting.

In certain embodiments, context and memory manager 210 applies schema-conformant propagation to align stored session data with orchestration workflows. Stored records may be represented as normalized embeddings, temporal alignment markers, or graph-encoded task dependencies. This enables strategic interrogation engine 212 and adaptive routing and arbitration module 214 to access context-aware features in a format compatible with their execution logic.

Context and memory manager 210 communicates directly with ingestion interface 202 to capture session identifiers, with validation interface 206 to log correction signals, and with orchestration datastore 220 to persist session checkpoints and rollback states. By embedding session continuity, workflow history, and persona-driven context into machine-executed arbitration, context and memory manager 210 ensures that orchestration system 106 generates outputs that maintain logical consistency across multi-step reasoning workflows.

Strategic interrogation engine 212 is operable to evaluate predictive outputs generated by SLAMs 108 and Butler agent 110 to detect inconsistencies, coverage gaps, or ambiguities, and to generate interrogation prompts that resolve such deficiencies. More specifically, strategic interrogation engine 212 applies machine-executed interrogation logic comprising contradiction tests, schema coverage analysis, and prompt generation routines that feed into validation interface 206 for human-in-the-loop or automated correction.

In an embodiment, contradiction tests are performed by computing natural-language inference (NLI) scores between candidate predictive outputs. Outputs with inference scores below a predetermined threshold are flagged as inconsistent. For example, if one SLAM 108 outputs "the transaction is permissible" while another outputs "the transaction violates policy," strategic interrogation engine 212 computes a low entailment score, marking the pair as contradictory.

Strategic interrogation engine 212 also performs schema coverage analysis by comparing predictive outputs against a requirement schema to identify unfulfilled fields or unsatisfied constraint conditions. As used herein, a "requirement schema" refers to a structured specification of expected fields, slot values, or rule conditions applicable to a given workflow. For example, if arbitration requires confirmation of three constraint fields and only two are present in SLAM outputs, strategic interrogation engine 212 flags the missing field as a coverage gap.

Based on detected contradictions or coverage gaps, strategic interrogation engine 212 generates interrogation prompts in machine-readable form. These prompts may request clarification from a human reviewer through validation interface 206 or trigger automated follow-up queries to the originating SLAM. For instance, when a coverage gap is detected in a compliance workflow, strategic interrogation engine 212 may generate a prompt such as "Provide slot value for regulatory code field X," which validation interface 206 delivers to a human reviewer for correction.

In certain embodiments, strategic interrogation engine 212 incorporates correction signals received from validation interface 206 back into orchestration workflows. Detected contradictions or schema gaps are resolved by updating arbitration payloads with corrected slot values or overriding contradictory outputs with validated responses. Logged interrogation events are stored in orchestration datastore 220, enabling training and optimization system 112 to refine interrogation rules and improve schema coverage in subsequent orchestration cycles.

Adaptive routing and arbitration module 214 is operable to apply arbitration logic to predictive outputs generated by SLAMs 108 and Butler agent 110, resolve conflicts among those outputs, and generate arbitration results for response synthesis. More specifically, adaptive routing and arbitration module 214 assigns priority values to candidate outputs using machine-executed scoring functions and produces either a selected top-ranked output or a composite output formed from multiple candidates.

In an embodiment, adaptive routing and arbitration module 214 retrieves confidence values provided by each SLAM 108 and Butler agent 110 as part of their output metadata. It also retrieves domain weighting coefficients associated with each SLAM 108, representing the relative reliability of a domain-specific model, and computes recency-of-evidence scores using curated dataset inputs received from curated data interface 208. For example, when two SLAMs produce conflicting financial assessments, the arbitration module may assign greater weight to the SLAM whose output is supported by a recently updated regulatory dataset.

Adaptive routing and arbitration module 214 combines the retrieved confidence values, domain weighting coefficients, and recency-of-evidence scores to calculate priority values for each output. Outputs are then ranked by priority, and arbitration results are generated by either selecting the highest-ranked output or composing a hybrid output. In certain embodiments, composite arbitration results preserve provenance metadata by embedding identifiers from each contributing output, enabling traceability through orchestration datastore 220.

Adaptive routing and arbitration module 214 further supports adaptive routing logic. Based on arbitration results, it may defer execution of certain SLAMs, re-route structured signals to additional SLAMs, or trigger follow-up processing by Butler agent 110. For example, if a compliance SLAM output falls below a priority threshold, the arbitration module may request additional context from curated data interface 208 before finalizing arbitration results.

In certain embodiments, adaptive routing and arbitration module 214 interfaces with validation interface 206 to incorporate correction signals into arbitration results. A correction signal that overrides a low-confidence SLAM output may elevate another SLAM output to top-ranked status, or inject a validated slot value into a composite arbitration result.

Persona and workflow selector 216 is operable to determine which specialized learner modules 108 are executed during an orchestration cycle based on workflow context, domain indicators, or persona activation states. More specifically, persona and workflow selector 216 applies machine-executed selection logic that analyzes structured signals and context metadata to activate a subset of SLAMs for processing while suppressing irrelevant modules.

In an embodiment, persona and workflow selector 216 retrieves persona identifiers maintained by context and memory manager 210 and maps them to model activation profiles. A persona identifier may define a role or use-case, such as "regulatory compliance analyst" or "clinical reviewer." Each persona identifier is associated with a set of SLAMs optimized for that domain. For example, when a compliance persona is active, persona and workflow selector 216 may activate regulatory and policy SLAMs while excluding conversational or narrative SLAMs.

Persona and workflow selector 216 is further operable to evaluate workflow context signals embedded in structured signals. Workflow context may include schema tags, task identifiers, or dependency-graph metadata. For example, if structured signals contain a dependency identifier specifying "risk scoring," persona and workflow selector 216 routes the signals to risk evaluation SLAMs and disables unrelated modules.

In certain embodiments, persona and workflow selector 216 maintains dynamic adjustment logic. When arbitration results from adaptive routing and arbitration module 214 indicate repeated low confidence across activated SLAMs, persona and workflow selector 216 may reconfigure activation by adding supplemental SLAMs or invoking Butler agent 110 for generalized reasoning. These adjustments are logged into orchestration datastore 220 for traceability.

Orchestration datastore 220 is operable to persist data generated during orchestration cycles, including structured signals, predictive outputs, arbitration results, correction signals, and provenance metadata. More specifically, orchestration datastore 220 provides a storage layer that enables orchestration system 106 to maintain session continuity, support rollback and checkpointing, and record auditable logs of model interactions.

Orchestration output interface 222 is operable to transmit arbitration results and related metadata from orchestration system 106 to response synthesis and delivery system 118 of FIG. 1. More specifically, orchestration output interface 222 provides a machine-executable channel that conveys selected or composite arbitration outputs, provenance metadata, and context identifiers to ensure that synthesized responses are generated in alignment with orchestration results.

In an embodiment, orchestration output interface 222 packages arbitration results into schema-conformant response payloads. Each payload may include the top-ranked or composite arbitration result, associated confidence scores, provenance tags linking outputs to specific SLAMs 108 or Butler agent 110, and session identifiers from context and memory manager 210. For example, when adaptive routing and arbitration module 214 produces a composite result combining outputs from two SLAMs and one Butler agent 110, orchestration output interface 222 encapsulates the combined result with metadata identifying each contributing source.

Orchestration output interface 222 is further operable to embed validation feedback and curated dataset references into response payloads. Correction signals received via validation interface 206 may be included alongside arbitration results to indicate which outputs were adjusted during conflict resolution. Curated dataset references retrieved through curated data interface 208 may be embedded as citation fields, allowing response synthesis and delivery system 118 to generate traceable outputs that reference authoritative external records.

In certain embodiments, orchestration output interface 222 supports multimodal response coordination by tagging payloads with modality directives. Modality directives specify whether the synthesized response should be generated as text, audio, or digital personal display output, and may include parameters such as speech rate or viseme mapping. For instance, when arbitration results are routed to an digital personal display delivery mode, orchestration output interface 222 may include directives mapping token sequences to gesture or facial animation cues.

Orchestration output interface 222 communicates with response synthesis and delivery system 118 over network 120 using authenticated, encrypted protocols. Logged payloads are persisted in orchestration datastore 220 for audit and rollback purposes. By packaging arbitration results, provenance metadata, validation feedback, and modality directives into structured payloads, orchestration output interface 222 ensures that response synthesis and delivery system 118 generates synthesized responses that remain traceable, schema-conformant, and consistent with orchestration decisions.

Accordingly, in accordance with various embodiments, the coordinated operation of the components of orchestration system 106 provides a computer-implemented technical framework for managing multi-model reasoning workflows. In particular, ingestion interface 202, SLAM/Butler interface 204, validation interface 206, curated data interface 208, context and memory manager 210, strategic interrogation engine 212, adaptive routing and arbitration module 214, persona and workflow selector 216, orchestration datastore 220, and orchestration output interface 222 collectively enable the system to transform multimodal inputs into structured signals, generate independent domain-specific and generalized outputs, and reconcile conflicts through arbitration logic that integrates curated datasets and validation feedback. This architecture enforces schema-conformant representations, maintains continuity across multi-turn sessions, and applies interrogation logic to identify inconsistencies and incomplete schema coverage. By producing arbitration results with associated provenance metadata and modality directives, orchestration system 106 improves the reliability, auditability, and interoperability of synthesized responses.

Specialized Learner Modules

Figure 3:
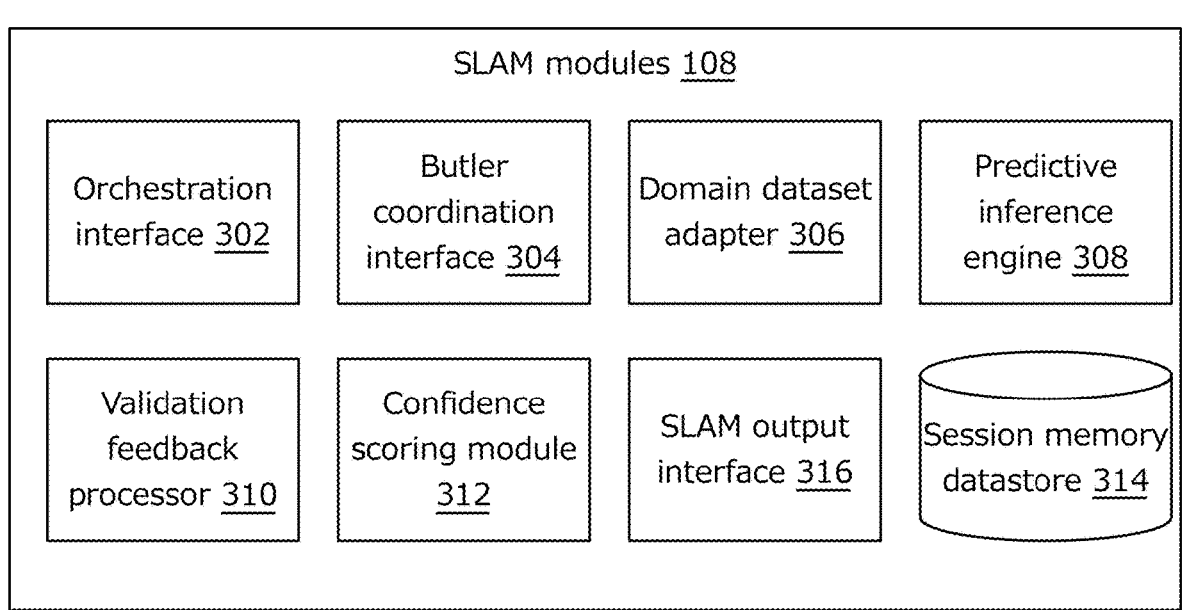
FIG. 3 illustrates an example architecture of specialized learner module (SLAM) in accordance with various embodiments.

FIG. 3 illustrates an example architecture of specialized learner module (SLAM) 108, in accordance with various embodiments. As shown, SLAM 108 includes orchestration interface 302, Butler coordination interface 304, domain dataset adapter 306, predictive inference engine 308, validation feedback processor 310, confidence scoring module 312, session memory datastore 314, and SLAM output interface 316. SLAM 108 may also be in communication with curated/external data sources 114 and validation interface system 116 through orchestration system 106. Other module configurations may be used, as would be understood by a person of ordinary skill in the art, without departing from the scope of the invention.

It should be noted that although the components of SLAM 108 are shown as separate modules, the underlying data and functionality may be maintained across fewer or additional modules depending on system implementation. Each component may access shared or distinct databases through orchestration system 106 to perform its corresponding functions, and such databases may also be accessed by other systems and services described herein. In certain embodiments, SLAM 108 may be hosted on a unitary server or distributed across multiple computing systems, including cloud-based, containerized, or edge deployments. Additionally, the components described with respect to SLAM 108 may be separated into independent services or consolidated into composite modules while still collectively performing the functionality described.

As illustrated in FIG. 3, specialized learner module (SLAM) 108 operates under coordination of orchestration system 106 described in FIG. 2. In operation, orchestration system 106 distributes structured signals to one or more SLAMs 108 for domain-specific reasoning. Each SLAM 108 executes inference within a defined domain scope and generates predictive outputs with associated confidence values, which are transmitted to orchestration system 106 via SLAM output interface 316. Orchestration system 106 may apply arbitration logic, integrate curated dataset inputs, and incorporate validation feedback to resolve conflicts among predictive outputs generated by multiple SLAMs 108 and Butler agent 110. In certain embodiments, SLAM 108 maintains session-level memory and adjusts inference behavior using domain dataset adapter 306 and validation feedback processor 310, ensuring consistency across iterative orchestration cycles. The modular arrangement supports deployment of any number of SLAMs (e.g., SLAM 108A, SLAM 108B, . . . . SLAM 108N), where "N" denotes an nth SLAM instance, thereby enabling parallelized domain specialization while preserving schema-conformant coordination with orchestration system 106.

Orchestration interface 302 is operable to manage bidirectional communication between specialized learner module (SLAM) 108 and orchestration system 106. More specifically, orchestration interface 302 is operable to receive structured signals distributed from orchestration system 106, translate the structured signals into domain-adapted inputs suitable for execution by predictive inference engine 308, and transmit predictive outputs generated within SLAM 108 back to orchestration system 106 for arbitration and response synthesis.

In certain embodiments, orchestration interface 302 applies schema alignment to ensure that structured signals conform to the domain schema expected by domain dataset adapter 306. For example, when structured signals include multimodal features such as linguistic tokens, visual descriptors, or gesture vectors, orchestration interface 302 may apply format normalization to represent each feature in a canonical schema-compliant structure before routing to predictive inference engine 308. In another embodiment, orchestration interface 302 tags incoming structured signals with session identifiers and persona identifiers provided by context and memory manager 210 of orchestration system 106, thereby allowing SLAM 108 to maintain context continuity during iterative executions.

Orchestration interface 302 is further operable to apply control parameters embedded in orchestration instructions, such as priority flags, gating constraints, or conditional execution rules specified by adaptive routing and arbitration module 214 of orchestration system 106. For example, orchestration system 106 may direct orchestration interface

302 to defer execution of predictive inference engine 308 until validation interface 206 confirms receipt of external correction signals. In another example, orchestration system 106 may set a threshold confidence value, and orchestration interface 302 enforces this parameter by discarding outputs from predictive inference engine 308 that fail to meet the threshold before transmission back to orchestration system 106.

In one embodiment, orchestration interface 302 manages communication over authenticated network protocols, supporting secure transport of structured signals and predictive outputs between SLAM 108 and orchestration system 106. This may include encryption of payloads, integrity verification using cryptographic checksums, and logging of interface events into orchestration datastore 220 for traceability. In another embodiment, orchestration interface 302 implements asynchronous message queues to support concurrent execution of multiple SLAMs 108A-N, thereby enabling orchestration system 106 to receive predictive outputs in parallel and apply arbitration logic without blocking on individual SLAM execution.

For example, when a multimodal input includes a financial transaction request expressed in both text and gesture input, orchestration interface 302 may receive the normalized structured signals from orchestration system 106, align the structured signals to the schema expected by domain dataset adapter 306, and transmit them to predictive inference engine 308. After execution, orchestration interface 302 packages the predictive outputs and associated confidence values, attaches provenance metadata, and returns the results to orchestration system 106. Arbitration logic within orchestration system 106 then resolves conflicts between predictive outputs from SLAM 108 and outputs from other SLAMs or Butler agent 110, ensuring a synthesized response consistent with validated schema rules and curated dataset inputs.

In certain embodiments, orchestration interface 302 executes schema translation, parameter enforcement, and provenance packaging functions that enable specialized learner module 108 to interoperate with orchestration system 106. These operations provide machine-executed support for distributing structured signals to domain-specific models, generating domain-specific outputs with confidence values, and returning predictive outputs in a form suitable for arbitration. Accordingly, orchestration interface 302 coordinates the technical processes described herein to ensure consistent interaction between specialized learner modules 108 and orchestration system 106.

Butler coordination interface 304 is operable to manage data exchange between SLAM 108 and Butler agent 110. More specifically, Butler coordination interface 304 is operable to (i) transmit structured inference requests from predictive inference engine 308 to Butler agent 110, (ii) receive generalized outputs from Butler agent 110, and (iii) align those outputs with the domain-specific outputs generated by SLAM 108. In certain embodiments, the Butler coordination interface 304 applies schema-based serialization to package requests in a normalized format suitable for generalized processing by Butler agent 110.

In an embodiment, Butler coordination interface 304 executes transformation logic to preserve provenance metadata during cross-agent exchanges. For example, a domain-specific output produced by predictive inference engine 308 may be tagged with a session identifier, a temporal index, and a confidence score. When transmitted to Butler agent 110, these tags are maintained to ensure that generalized reasoning incorporates contextual continuity. Conversely, generalized outputs returned by Butler agent 110 are annotated with priority values and integration markers, which allow adaptive routing and arbitration module 214 of orchestration system 106 to evaluate relative weight between domain-specific and generalized reasoning results.

For example, when SLAM 108 produces a financial risk assessment output and Butler agent 110 generates a generalized reasoning output recommending further data validation, Butler coordination interface 304 associates the generalized output with the originating financial risk context and provides both outputs to orchestration system 106 for arbitration. This ensures alignment between domain-focused inference and broad reasoning.

In certain embodiments, Butler coordination interface 304 is further operable to support multi-turn interactions where predictive inference engine 308 requires iterative clarification from Butler agent 110. In such cases, Butler coordination interface 304 maintains state continuity by caching intermediate responses in session memory datastore 314, enabling later reconciliation of domain-specific and generalized results.

In an embodiment, by enforcing schema-conformant serialization, metadata preservation, and multi-turn exchange handling, Butler coordination interface 304 provides a structured mechanism for aligning specialized learner outputs with generalized outputs. This coordination ensures that orchestration system 106 receives both classes of predictive outputs in a machine-readable, context-preserved form suitable for arbitration and synthesis.

Domain dataset adapter 306 is operable to interface SLAM 108 with curated/external data sources 114 for retrieving, normalizing, and aligning domain-specific reference data. More specifically, domain dataset adapter 306 is operable to (i) query structured or unstructured records from one or more external databases, (ii) validate the integrity of the retrieved records, (iii) transform the records into a schema-conformant representation compatible with predictive inference engine 308, and (iv) propagate the transformed records into SLAM 108 for incorporation into domain-specific inference.

In an embodiment, domain dataset adapter 306 retrieves financial records, medical datasets, or geospatial logs depending on the specialization of the respective SLAM 108 instance. The adapter may apply cryptographic hash verification to validate the integrity of each record before transformation. Transformation logic may include tokenizing unstructured text, embedding tabular values into a vector space, or mapping categorical fields into a controlled ontology. Each transformed record is annotated with a timestamp and provenance identifier to ensure traceability during arbitration and synthesis processes.

For example, in a healthcare-focused SLAM 108, domain dataset adapter 306 may retrieve patient history from an external electronic health record system via an application programming interface (API). The adapter applies normalization rules to convert the retrieved records into a schema that defines diagnostic codes, temporal ordering of events, and measurement units. The normalized dataset is then provided to predictive inference engine 308, allowing the inference process to incorporate validated medical context alongside multimodal input signals.

In certain embodiments, domain dataset adapter 306 is further operable to update schema mappings dynamically in response to orchestration directives received from orchestration system 106. For example, adaptive routing and arbitration module 214 may signal that a new curated dataset source should be prioritized, causing the adapter to load an alternate schema mapping profile and reconfigure normalization pipelines accordingly.

Domain dataset adapter 306 may also maintain a local cache of schema-conformant records within session memory datastore 314, enabling predictive inference engine 308 to perform low-latency access without re-querying external data sources. Cached records may be refreshed based on staleness thresholds or orchestration-level instructions, ensuring that inference operations rely on up-to-date reference material.

In accordance with various embodiments, by enforcing schema-conformant transformation, provenance annotation, and orchestration-aware dataset integration, domain dataset adapter 306 ensures that curated/external data sources 114 contribute structured, validated, and context-preserved information into SLAM 108. This enables predictive inference engine 308 to generate domain-specific outputs that are both contextually grounded and technically aligned with arbitration requirements of orchestration system 106.

Predictive inference engine 308 is operable to execute the small language model of SLAM 108 against structured signals received from orchestration interface 302, supplemented with reference records provided by domain dataset adapter 306. More specifically, predictive inference engine 308 is operable to (i) tokenize schema-conformant signals, (ii) encode tokens into embedding vectors, (iii) apply the trained parameters of the small language model to generate predictive outputs, and (iv) associate each predictive output with a confidence value indicating statistical reliability.

In an embodiment, predictive inference engine 308 executes machine-learning inference by propagating input vectors through transformer-based encoder-decoder layers trained for domain-specific reasoning. For example, in a financial SLAM, predictive inference engine 308 may evaluate structured signals representing transaction amounts, counterparties, and temporal markers against historical transaction embeddings to generate an anomaly prediction. In a healthcare SLAM, the same engine may process structured signals representing patient symptoms, lab results, and diagnosis codes to predict likely treatment options or outcomes.

Predictive inference engine 308 may also enforce schema alignment during output generation. For instance, generated outputs may be required to conform to predefined fields such as "diagnosis_code," "treatment_plan," or "transaction_type." Outputs failing schema validation are flagged and routed to validation feedback processor 310 for correction or re-issuance.

In certain embodiments, predictive inference engine 308 incorporates contextual payloads provided by context and memory manager 210 of orchestration system 106. These payloads may include summary vectors derived from prior session history, active persona identifiers, or dependency-graph metadata. The payloads are concatenated with the structured signals at the embedding layer, enabling the small language model to generate predictions that reflect continuity across multi-turn workflows.

Predictive inference engine 308 further annotates each predictive output with metadata describing the model version, input features used, and provenance of supporting curated data. These annotations are propagated along with the output to confidence scoring module 312 and orchestration system 106, ensuring arbitration and synthesis processes can weigh outputs deterministically.

For example, in a logistics-focused SLAM, predictive inference engine 308 may process structured signals indicating package dimensions, origin, and route identifiers, augmented with curated weather data. The engine may generate a predictive output estimating arrival delays, annotated with a confidence score and provenance reference to the weather dataset. Such outputs are then forwarded for arbitration alongside generalized outputs from Butler agent 110.

In an embodiment, by implementing tokenization, embedding generation, schema-conformant validation, and contextual payload incorporation, predictive inference engine 308 provides domain-specific predictive outputs that integrate seamlessly into arbitration logic executed by orchestration system 106.

Validation feedback processor 310 is operable to process correction signals and human-in-the-loop inputs received via validation interface system 116. More specifically, validation feedback processor 310 is operable to (i) receive structured or unstructured validation inputs, (ii) normalize the validation inputs into a machine-readable format, (iii) align the normalized validation inputs with predictive outputs generated by predictive inference engine 308, and (iv) update arbitration parameters or model state accordingly.

In an embodiment, validation feedback processor 310 ingests correction signals submitted as JSON payloads specifying updated slot values, missing schema fields, or contradiction resolutions. The processor maps each correction signal to the corresponding predictive output using provenance metadata and temporal identifiers. The normalized corrections may then be stored in session memory datastore 314 for reuse across the session and propagated to orchestration system 106 for arbitration integration.

For example, in a financial SLAM, a human reviewer may flag that a transaction classified as "purchase" should instead be classified as "refund." Validation feedback processor 310 parses the correction, normalizes the label into schema-conformant form, and updates arbitration logic parameters to ensure that subsequent predictions weight the corrected label higher. In another example, in a healthcare SLAM, a reviewer may add a missing lab result value. The processor incorporates the missing field into the structured schema, re-evaluating the predictive output to reflect the corrected patient record.

Validation feedback processor 310 may further perform confidence re-scoring by adjusting confidence values associated with outputs corrected or validated by human input. For instance, outputs verified by a reviewer may be assigned elevated confidence scores, while outputs contradicted by validation input may be down-weighted or flagged for re-processing.

In certain embodiments, validation feedback processor 310 communicates with training and optimization system 112 to propagate corrections into retraining pipelines. Normalized correction signals may be aggregated with curated datasets to form updated training batches, ensuring that specialized learner modules (SLAMs 108) improve accuracy across iterations.

In an embodiment, by performing normalization, alignment, and parameter updating, validation feedback processor 310 ensures that human-in-the-loop validation signals and correction data directly influence predictive inference and arbitration, creating a technically auditable feedback loop across SLAM 108, orchestration system 106, and training and optimization system 112.

Confidence scoring module 312 is operable to compute quantitative measures of reliability for predictive outputs generated by predictive inference engine 308. More specifically, confidence scoring module 312 is operable to (i)

extract intermediate features from inference computations, (ii) apply scoring algorithms that evaluate output quality relative to schema coverage and domain-specific rules, (iii) generate a confidence value for each predictive output, and (iv) transmit the confidence values to orchestration system 106 for arbitration.

In an embodiment, confidence scoring module 312 applies statistical likelihood scoring by evaluating token probabilities across generated sequences and aggregating them into normalized scores. In another embodiment, coverage analysis is performed by comparing predictive outputs to requirement schemas and assigning penalties for unfulfilled slots or unsatisfied constraints. For example, when a SLAM configured for contract analysis produces an output that omits mandatory fields such as effective date or jurisdiction, confidence scoring module 312 computes a reduced score reflecting the structural incompleteness.

Confidence scoring module 312 may also incorporate validation-adjusted weighting. In this case, confidence scores are increased when outputs are consistent with validation feedback processor 310 inputs, or decreased when conflicts are detected. In certain embodiments, curated dataset signals from curated/external data sources 114 are used to augment scoring, ensuring that predictive outputs align with authoritative reference data.

For example, in a healthcare SLAM analyzing diagnostic inputs, confidence scoring module 312 may assign higher confidence to outputs corroborated by external clinical datasets, while lowering scores for outputs inconsistent with known lab ranges. In a compliance SLAM, confidence scoring module 312 may weight outputs based on recency-of-evidence measures, giving preference to outputs derived from recently validated policies.

The resulting confidence values may be stored in session memory datastore 314 together with predictive outputs, providing orchestration system 106 with machine-computed metrics for arbitration decisions. By performing structured probability scoring, schema coverage evaluation, and validation-weighted adjustment, confidence scoring module 312 establishes a reproducible and auditable technical process for ranking predictive outputs within SLAM 108.

Session memory datastore 314 is operable to persist predictive outputs, confidence values, validation corrections, and context metadata generated during the execution of SLAM 108. More specifically, session memory datastore 314 is operable to (i) record predictive outputs and associated confidence values keyed by session identifiers, (ii) maintain temporal ordering of multimodal input features and corresponding inferences, (iii) store validation feedback aligned to output provenance markers, and (iv) provide retrieval operations that support context continuity and arbitration.

In an embodiment, session memory datastore 314 stores tokenized outputs from predictive inference engine 308 together with confidence scores generated by confidence scoring module 312. Each record is indexed by session identifier, temporal offset, and SLAM identifier, enabling orchestration system 106 to retrieve domain-specific results across multi-turn interactions. In another embodiment, validation feedback processor 310 commits normalized corrections into the datastore, appending correction metadata such as reviewer identity, correction type, and timestamp.

For example, in a regulatory compliance SLAM, session memory datastore 314 may persist intermediate rule-matching results and subsequent correction data, allowing orchestration system 106 to adjust arbitration outcomes in later steps. In a healthcare SLAM, lab interpretation outputs and correction inputs can be stored in session memory datastore 314 to provide continuity across longitudinal patient sessions, ensuring consistency in multi-visit analysis.

Session memory datastore 314 may also maintain dependency graphs or checkpoint states associated with prior executions. These states enable rollback or re-evaluation in cases where contradictory predictive outputs are identified by strategic interrogation engine 212. By retaining both uncorrected and corrected outputs, session memory datastore 314 supports reproducible arbitration and auditability of decision processes.

In certain embodiments, session memory datastore 314 exchanges records with orchestration datastore 220 to synchronize session-level context across multiple SLAM instances and with Butler agent 110. This inter-module coordination allows predictive outputs and validation records to be propagated across the system, ensuring orchestration logic incorporates session history and correction lineage when resolving conflicts among multiple specialized and generalized outputs.

SLAM output interface 316 is operable to transmit domain-specific outputs, confidence values, and associated metadata from SLAM 108 to orchestration system 106 and other connected components. More specifically, SLAM output interface 316 is operable to (i) package predictive outputs generated by predictive inference engine 308 together with confidence scores from confidence scoring module 312, (ii) append provenance metadata including session identifiers, schema mappings, and correction lineage, (iii) serialize the packaged data into a standardized exchange format, and (iv) transmit the serialized package to orchestration system 106 for arbitration and coordination.

In an embodiment, SLAM output interface 316 serializes outputs into schema-conformant JSON or protocol buffer messages, ensuring interoperability across heterogeneous orchestration pipelines. The serialized messages may include explicit field labels that link each output element to a corresponding schema slot, enabling orchestration system 106 to directly compare coverage and contradictions across multiple SLAMs.

For example, in a financial analysis SLAM, SLAM output interface 316 may transmit a JSON record comprising extracted transaction type, amount, and currency fields, annotated with a confidence value for each field. In a healthcare SLAM, the interface may output a structured record including diagnostic codes, lab interpretation results, and confidence values, linked to validation metadata indicating whether any corrections were previously applied.

SLAM output interface 316 may further support asynchronous messaging with orchestration system 106, buffering outputs when arbitration resources are temporarily unavailable and retrying transmission using guaranteed delivery protocols. In certain embodiments, SLAM output interface 316 propagates outputs not only to orchestration system 106 but also to session memory datastore 314 to preserve local copies of transmitted results, ensuring redundancy and auditability.

In accordance with various embodiments, by performing structured packaging, schema-conformant serialization, and metadata preservation, SLAM output interface 316 ensures that predictive outputs from specialized learner modules are communicated in a reproducible and technically auditable form.

As described, specialized learner module (SLAM) 108 implements a machine-executed module that processes structured signals to generate domain-specific predictive outputs with associated confidence values and validation lineage. SLAM 108 establishes a schema-conformant framework in which domain dataset adapter 306, predictive inference engine 308, validation feedback processor 310, confidence scoring module 312, session memory datastore 314, and SLAM output interface 316 cooperate under orchestration directives from orchestration system 106. This arrangement ensures that predictive outputs are generated, scored, validated, stored, and transmitted in a reproducible and auditable format. In various embodiments, SLAM 108 enforces schema coverage, applies feedback-adjusted scoring, and maintains continuity across iterative orchestration cycles. The modular architecture of SLAM 108 enables coordinated operation with multiple SLAMs 108 and Butler agent 110, allowing arbitration logic in orchestration system 106 to operate over structured, validated, and technically differentiated predictive results.

Model Training Pipeline

Figure 4:
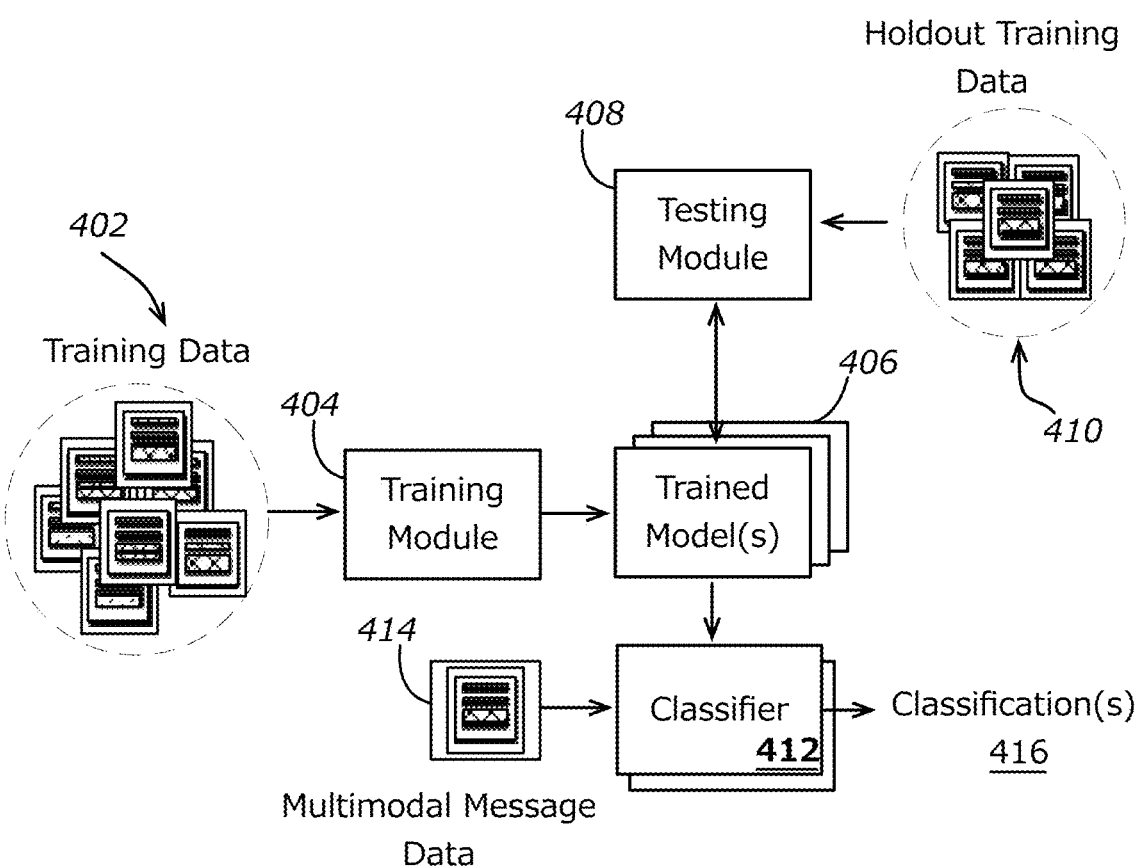
FIG. 4 illustrates an example model training pipeline for refining machine learning models in accordance with various embodiments.

FIG. 4 illustrates an example training pipeline for refining specialized learner modules (SLAMs 108) and Butler agent 110, in accordance with various embodiments. In this example, a set of training data 402 is collected from operational outputs of orchestration system 106 and its subcomponents, including structured signals, predictive outputs, confidence scores, validation feedback, and arbitration results. Training data 402 is used by training module 404 to update parameters of SLAMs 108 and Butler agent 110 for domain-specific reasoning and generalized inference.

Training data 402 may include multimodal feature vectors, structured schema representations, domain-specific outputs, confidence values, user correction signals, curated dataset records, and expert-verified annotations obtained through the human-in-the-loop training protocol. In certain embodiments, training data 402 is augmented with synthetic examples generated by perturbing structured signals, masking schema fields, or simulating contradictory outputs to improve model resilience against incomplete or adversarial inputs.

Training module 404 is operable to preprocess training data 402 by normalizing schema versions, aligning vector dimensions, and standardizing feedback formats. Preprocessing may include logit transformation of confidence values, embedding alignment across SLAM domains, and normalization of validation records into machine-readable form. Training module 404 applies supervised learning, semi-supervised learning, or reinforcement learning techniques to refine predictive inference engines 308 within SLAMs 108 and parameters of Butler agent 110.

Trained models 406 are evaluated using testing module 408 with holdout testing data 410. Testing data 410 may include previously unseen multimodal records, validation corrections, expert-curated examples, and arbitration outcomes excluded from training. Testing module 408 computes metrics such as output accuracy, schema coverage rate, confidence calibration error, and arbitration consistency. If testing criteria are satisfied, the updated SLAMs 108 or Butler agent 110 are deployed into classifier module 412 for operational use.

Classifier module 412 processes incoming multimodal message data 414—such as structured signals generated by ingestion system 104 or outputs returned by validation interface system 116—and produces classification results 416. These results may include domain-specific outputs, confidence scores, schema field completions, or synthesized rationale. In certain embodiments, classifier module 412 applies ensemble logic combining updated SLAMs 108 and Butler agent 110 to account for uncertainty, domain overlap, or partial input coverage.

Training and optimization system 112 supports continuous learning by incorporating updated records from operational deployments, including corrected outputs, arbitration adjustments, and expert review annotations received via validation interface system 116. Orchestration system 106 may trigger retraining cycles or schedule model deployment updates, ensuring that SLAMs 108 and Butler agent 110 evolve based on observed usage patterns, empirical correction data, and performance monitoring.

In certain embodiments, training and optimization system 112 also employs unsupervised clustering or self-supervised techniques to identify structure in unannotated data. For example, clusters of high-entropy predictive outputs may be flagged for analyst review or automated retraining. Telemetry monitoring logic may track feature drift, schema coverage consistency, and interrogation sensitivity, supporting rollback or retraining when degradation is detected.

Process for Determining and Refining Training Data

Figure 5:
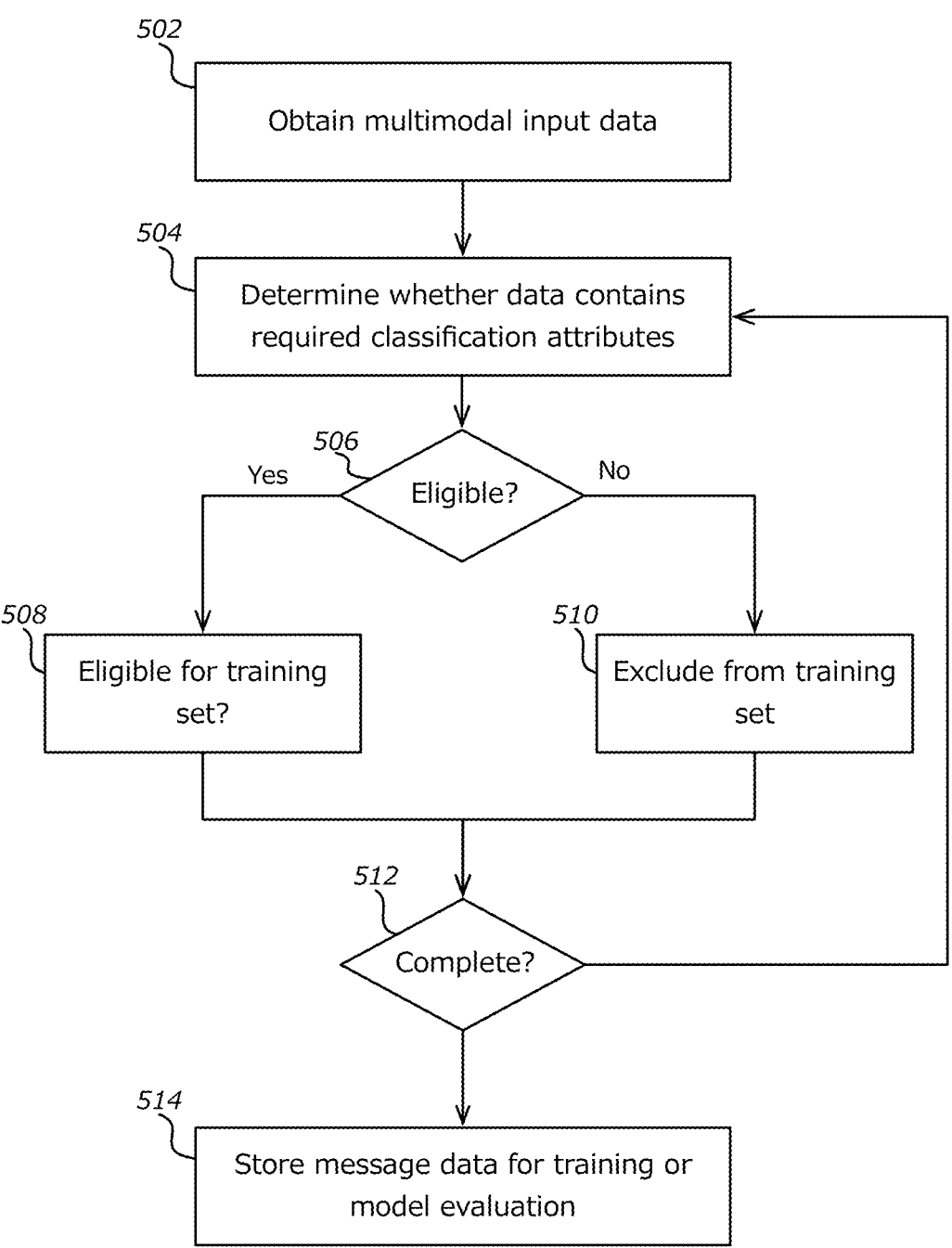
FIG. 5 illustrates an example process for determining and refining training data in accordance with various embodiments.

FIG. 5 illustrates an example process for determining and refining training data used to improve the performance of specialized learner modules (SLAMs 108) and Butler agent 110, in accordance with various embodiments. In an embodiment, this process is implemented within training and optimization system 112 to improve predictive accuracy, confidence calibration, and arbitration stability across orchestration system 106 and its subcomponents. The refined training data supports the retraining of SLAMs 108 and Butler agent 110, ensuring outputs remain schema-conformant and context-consistent during coordinated orchestration.

The process begins at step 502, where multimodal input data is obtained from ingestion system 104 or collected from operational records maintained by orchestration system 106. Such data may include structured signals, predictive outputs, arbitration results, validation feedback records, and session-level metadata. In certain embodiments, expert-review annotations produced through the human-in-the-loop training protocol are also collected and encoded as structured correction records to supplement operational data. In certain embodiments, annotations are derived during operation, such as contradiction detection results, unresolved schema fields, or persona activation indicators.

At step 504, training and optimization system 112 determines whether the collected data includes attributes necessary for supervised training or confidence recalibration. This may include checking for labeled validation outcomes, schema field coverage, presence of contradiction resolutions, or arbitration weights applied during orchestration. Records containing verified expert annotations may be prioritized for inclusion to increase reliability of retraining data. For example, a session with recorded correction signals and complete SLAM/Butler outputs may qualify for training inclusion, while incomplete sessions lacking schema alignment may be deferred.

A determination is made at step 506 regarding whether the collected record is eligible for training inclusion. If eligible, the process proceeds to step 508, where the record is tagged with metadata including session identifier, SLAM identifier, arbitration rationale, and model version lineage, before being stored for training set assembly or evaluation. If the record is not eligible, it is excluded at step 510. In certain embodiments, excluded records are archived for error analysis or augmented synthetically, for example by perturbing structured signals or simulating contradictory outputs.

At step 512, training and optimization system 112 evaluates whether the assembled training set meets completeness thresholds. These thresholds may include coverage across SLAM domains, distribution across confidence levels, or alignment with retraining objectives such as reducing arbitration error or increasing schema coverage. If completeness is not met, the process returns to step 502 for further collection.

If completeness is achieved, the process advances to step 514, where the training data and associated metadata are stored in repositories used by training pipeline 400 of FIG. 4. These repositories may include schema-normalized feature logs, annotated contradiction resolutions, expert-verified corrections, or validation-corrected predictive outputs. The stored datasets are then used to retrain predictive inference engines 308 within SLAMs 108 and parameters of Butler agent 110.

In accordance with various embodiments, the process enables adaptive training of system components based on operational orchestration cycles and observed arbitration outcomes. For example, specialized SLAMs for healthcare, finance, or compliance may be retrained using records assembled through the process. Feedback loops from orchestration system 106 and validation interface system 116 may further refine which records are prioritized, supporting improved robustness and continuity across iterative orchestration sessions.

The process described in FIG. 5 supports continuous adaptation in orchestrated multi-model reasoning environments, allowing SLAMs 108 and Butler agent 110 to evolve in response to novel data distributions, contradictory outputs, expert-review findings, or validation trends. In certain embodiments, the process further enables techniques such as contrastive learning, synthetic augmentation, or uncertainty-based sampling to optimize training-set composition and improve generalizability of the models.

Process for Training and Deploying Models

Figure 6:
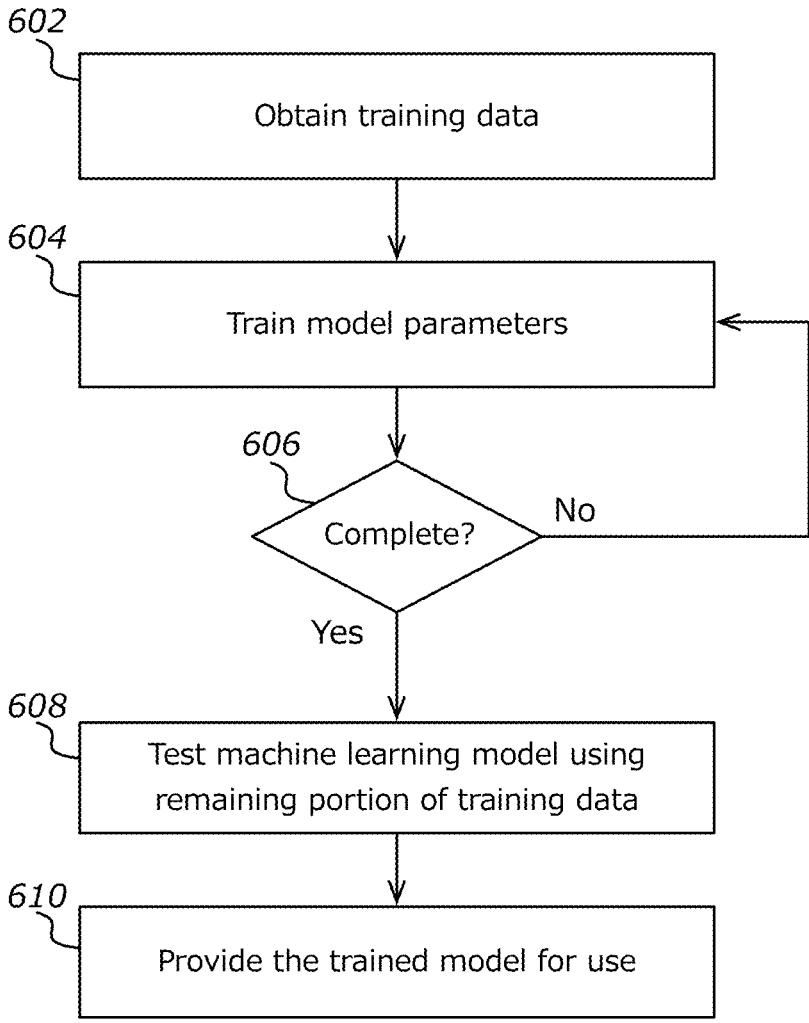
FIG. 6 illustrates an example process for testing, evaluation, and deployment of trained models in accordance with various embodiments.

FIG. 6 illustrates an example process for training and deploying models within training and optimization system 112, in accordance with various embodiments. The process begins at step 602, where training data is obtained. Training data may include structured signals, predictive outputs from SLAMs 108 and Butler agent 110, validation feedback, arbitration results, curated dataset records, and expert-review annotations integrated as structured correction signals. In certain embodiments, training data is partitioned into subsets for supervised training, calibration, and evaluation.

At step 604, training and optimization system 112 trains model parameters using the collected data. Training may include adjusting weights of predictive inference engines 308 within SLAMs 108, refining embedding alignment layers, or updating arbitration calibration logic for Butler agent 110. Training may further incorporate human-expert-verified examples to refine domain-specific reasoning models and improve reliability across knowledge domains. Training may further incorporate synthetic augmentation or self-supervised routines to enhance coverage across schema slots or domain-specific reasoning tasks.

At step 606, the system determines whether training is complete by evaluating convergence criteria or performance thresholds. If convergence is not achieved, the process may loop back to step 604 for additional training iterations using adjusted hyperparameters or expanded data subsets.

At step 608, the trained models are tested using a reserved portion of the training data. Testing includes computing accuracy of predictive outputs, calibration error of confidence scores, schema coverage rates, and arbitration consistency metrics. In certain embodiments, testing also evaluates divergence between SLAM outputs and Butler outputs to confirm stability of orchestration. Expert-verified benchmark records may also be used to confirm that retrained models maintain alignment with validated domain behavior.

If testing criteria are satisfied, the process advances to step 610, where the trained models are deployed for use within orchestration system 106. Deployment may include loading updated SLAMs 108 into operational pipelines, updating Butler agent 110 parameters, or synchronizing model versions across distributed orchestration nodes.

In accordance with various embodiments, this process ensures that models used by SLAMs 108 and Butler agent 110 are iteratively retrained, tested, and deployed under technical safeguards that enforce schema conformance, validation feedback incorporation, expert-review alignment, and arbitration stability. Training and optimization system 112 thereby provides a continuous improvement loop for orchestrated multi-model reasoning workflows.

As described in FIGS. 4-6, training and optimization system 112 implements a structured pipeline for refining specialized learner modules (SLAMs 108) and Butler agent 110. Unlike conventional training processes that operate on static datasets and produce opaque updates, training and optimization system 112 executes a machine-enforced cycle that collects schema-conformant training data, normalizes multimodal signals, and incorporates validation feedback, expert-review annotations, and arbitration results into retraining workflows. The system further applies convergence checks, calibration testing, and schema coverage evaluation before deploying updated models. These processes ensure that SLAMs 108 and Butler agent 110 evolve under reproducible and auditable conditions, with session lineage and correction records preserved throughout training. In various embodiments, training and optimization system 112 thereby provides a continuous improvement loop that aligns predictive outputs, arbitration stability, expert-informed validation, and feedback integration into a technically structured orchestration environment coordinated by orchestration system 106.

Process for Orchestrated Multi-Model Processing and Response Generation

Figure 7:
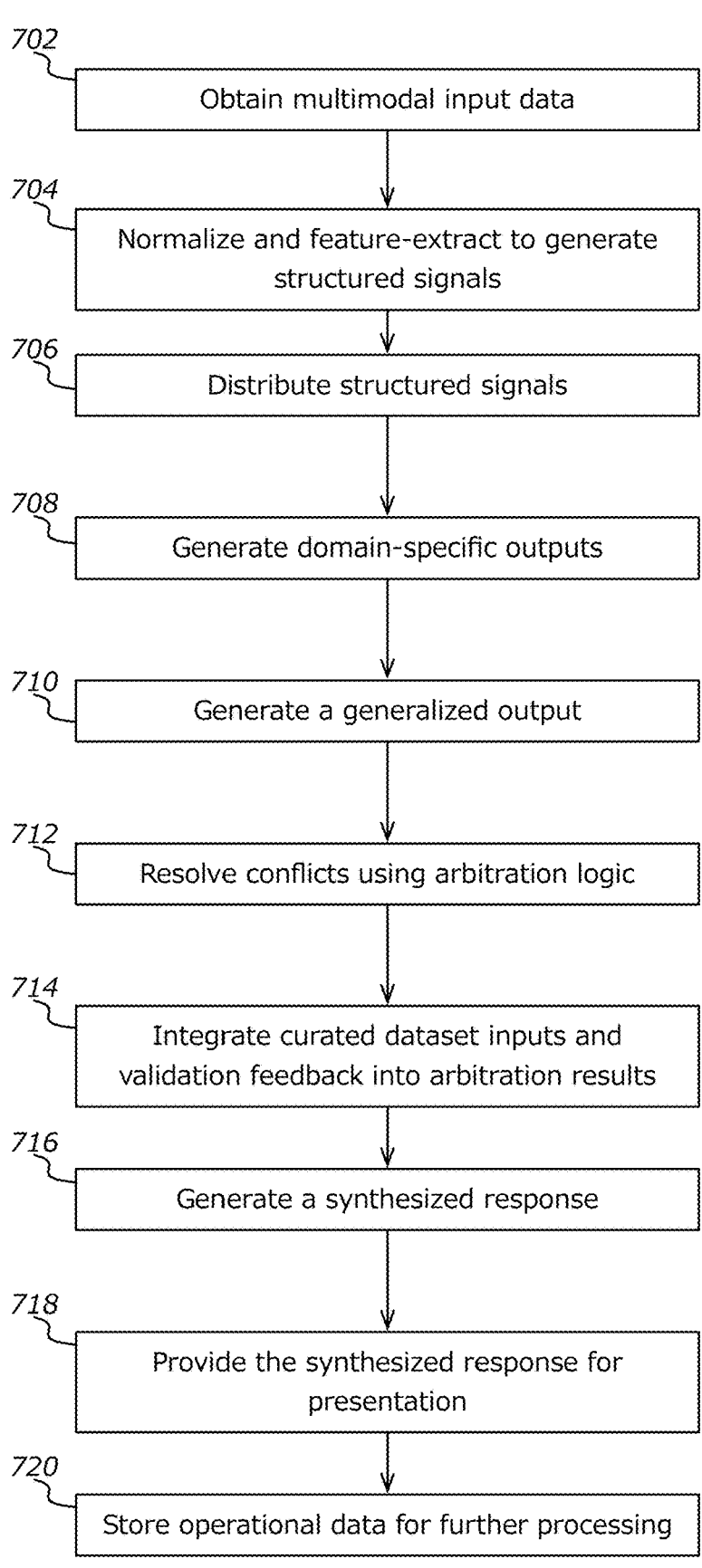
FIG. 7 illustrates an example process for orchestrated multi-model processing and response generation in accordance with various embodiments.

FIG. 7 illustrates an example process flow for orchestrated multi-model processing and response generation, in accordance with various embodiments. The steps shown represent machine-executed operations that may be performed in sequence, in parallel, or conditionally based on orchestration directives. The process includes obtaining multimodal input data, generating structured signals, distributing the structured signals to specialized learner modules and a generalized agent, generating respective predictive outputs, resolving conflicts using arbitration logic, integrating curated dataset inputs and validation feedback, synthesizing a response, and providing the synthesized response for presentation to user device(s). The process may include additional steps, fewer steps, or be executed in a different order without departing from the scope of the invention, as would be apparent to a person of ordinary skill in the art.

In step 702, the system obtains multimodal input data comprising text data, audio data, video data, or gesture data. The multimodal input data may originate from user device(s) 102, integrated third-party applications, or external sensors communicatively coupled through network 120. In various embodiments, text data may include typed queries, document excerpts, or chat transcripts; audio data may include spoken queries, recorded instructions, or continuous conversation streams; video data may include uploaded clips, camera-captured sessions, or shared presentation feeds; and gesture data may include motion vectors, body posture encodings, or pointer-based inputs.

In certain embodiments, ingestion system 104 is operable to receive the multimodal input data, register each input with a session identifier, and associate the session with metadata such as device context, channel origin, or modality type. Ingestion system 104 may apply buffering and encoding operations tailored to each modality. For example, audio data can be sampled and stored with timing metadata, video can be segmented into frame descriptors, and gesture sequences can be encoded into vectorized motion signals. In one example, when a user issues a spoken query while gesturing at an on-screen element through a smart glasses interface, ingestion system 104 receives both the audio and gesture modalities, aligns them under a common session identifier, and records timestamps to preserve temporal continuity.

In step 704, the system normalizes the multimodal input data and performs feature extraction to generate structured signals. For example, In an embodiment, each modality is first converted into a common representation format to ensure interoperability across subsequent processing components. For example, text data may be tokenized into linguistic units, audio data may be transformed into spectral embeddings, video data may be decomposed into frame descriptors, and gesture data may be encoded into motion vectors.

The system aligns the modality-specific representations by mapping extracted features to a temporal index, thereby synchronizing inputs captured at different times or from different channels. The temporally aligned features are then propagated into a schema-conformant representation, where attributes such as linguistic tokens, audio embeddings, visual frame descriptors, and gesture vectors are organized under a unified schema. In certain embodiments, ingestion system 104 applies schema-based normalization rules to enforce consistent field definitions across modalities, such as aligning a spoken keyword in audio with its corresponding visual cue in video or gesture data.

For example, when a user provides a spoken command while pointing at an image on a display, the audio stream is converted into phonetic embeddings, the gesture is transformed into a spatial vector, and both are indexed to the same temporal position. The features are then placed into schema-defined fields (e.g., {command_term, gesture_target}), generating structured signals conformant to the schema for distribution to orchestration system 106.

In step 706, the system distributes structured signals to, e.g., a plurality of specialized learner modules (SLAMs 108) and to Butler agent 110 under coordination of orchestration system 106. Each structured signal is evaluated against routing logic implemented within adaptive routing and arbitration module 214. The routing logic applies schema-based tags, feature type identifiers, and workflow metadata to determine which SLAMs 108 are relevant for execution.

In one example, the structured signals include audio embeddings and linguistic tokens. The routing logic compares modality tags in the schema representation against a SLAM registry table. The table specifies that SLAM 108A is operable for linguistic processing and SLAM 108C is operable for audio processing. Accordingly, orchestration system 106 activates SLAMs 108A and 108C, while bypassing inactive SLAMs whose registered domains are not matched.

In certain embodiments, orchestration system 106 selects a subset of SLAMs 108 for execution in parallel by evaluating resource availability and dependency-graph metadata maintained in orchestration datastore 220. For example, when two SLAMs are registered as dependent tasks (e.g., gesture recognition SLAM 108B requires language context from SLAM 108A), the routing logic defers execution of the dependent SLAM until prerequisite outputs are available. Concurrently, the structured signals can be transmitted to Butler agent 110, which is operable to generate a generalized predictive output without domain restriction.

As an illustrative case, when a multimodal input includes text describing a financial calculation and a simultaneous gesture indicating a chart region, orchestration system 106 routes the text features to a finance-domain SLAM 108D, routes the gesture vectors to a spatial SLAM 108B, and simultaneously transmits the entire structured signal set to Butler agent 110. SLAM 108D produces domain-specific numeric reasoning, SLAM 108B produces gesture localization vectors, and Butler agent 110 produces a generalized interpretation spanning both modalities.

In step 708, the system executes the selected specialized learner modules (SLAMs 108) to generate domain-specific outputs. Each SLAM 108 receives the structured signals routed from orchestration system 106 and applies predictive inference engine 308 to process features within its registered knowledge domain. The execution is isolated per SLAM, with each predictive inference engine 308 producing an output representation and associated metadata including a confidence score generated by confidence scoring module 312.

In one embodiment, SLAM 108A registered for financial reasoning receives structured tokens describing a transaction and applies vector-based inference to compute a balance adjustment. Concurrently, SLAM 108B registered for gesture recognition receives temporally aligned gesture vectors and produces a spatial mapping output identifying the referenced chart region. Each SLAM's output is serialized in a schema-conformant format for subsequent arbitration.

The orchestration system 106 maintains session memory datastore 314 for each active SLAM 108, ensuring continuity across iterative executions. For example, if a legal-domain SLAM 108C has previously processed contract clauses for ambiguity detection, the session memory datastore 314 stores clause identifiers and prior contradiction flags, which are automatically reapplied when new but related clauses are encountered. This allows SLAM 108C to return an output enriched with historical consistency markers.

As an illustrative example, when multimodal input data includes a financial calculation embedded in text, an accompanying gesture pointing to a visual chart, and an audio clarification, SLAM 108A executes financial reasoning to produce a numeric adjustment vector, SLAM 108B executes gesture recognition to produce a spatial coordinate mapping, and SLAM 108N executes speech-domain reasoning to produce a transcription and disambiguation marker. These domain-specific outputs are then transmitted to orchestration system 106 for arbitration in step 712.

In step 710, a generalized output is generated from the structured signals using model-executed inference that is not restricted to a particular domain. The system transforms the structured signals into embeddings compatible with a generalized reasoning framework and executes inference over the embeddings to produce a candidate output along with associated probability distributions.

In one embodiment, the structured signals are tokenized and projected into a unified embedding space, where cross-attention layers evaluate linguistic, visual, and numerical features together. The inference produces a sequence of tokens that form the generalized output, which is accompanied by metadata such as confidence values and feature lineage identifiers.

For example, when structured signals include a spoken instruction, a highlighted region of a chart, and numerical values from a spreadsheet, the system encodes each into embeddings, aligns them within the model's inference window, and generates an instruction such as "apply recalculation to the highlighted chart region using the spreadsheet values."

In various embodiments, Butler agent 110 is operable to perform the inference described above and to format the generalized output into a schema-conformant representation, including provenance metadata that ties the output back to the original structured signals. The generalized output is then returned to orchestration system 106 for arbitration against domain-specific outputs at step 712.

In step 712, conflicts among candidate outputs are resolved using arbitration logic. The system evaluates predictive outputs from multiple reasoning sources and applies machine-executed rules to determine which outputs should be retained, combined, or discarded. Arbitration includes ranking outputs against a set of weighting measures and generating arbitration results that reflect a consistent resolution across all active workflows.

The arbitration process may compute a model-provided confidence value for each predictive output, retrieve a domain weighting coefficient associated with its source, and calculate a recency-of-evidence score derived from curated dataset inputs. These measures are normalized into a common scale and combined through a priority-assignment function. In one embodiment, arbitration logic applies a deterministic ranking to select the highest-priority output. In another embodiment, arbitration logic forms a composite output by concatenating or templating portions of multiple predictive outputs, while preserving provenance metadata for each contributing portion.

For example, if a specialized learner module returns a domain-specific instruction with high confidence and recent supporting data, while the generalized output provides broader context but with lower confidence, arbitration logic may select the specialized instruction as the arbitration result. In contrast, if two SLAMs provide complementary domain outputs with equal priority, arbitration logic may combine them into a composite result and record the lineage of each segment.

In certain embodiments, orchestration system 106 executes the arbitration logic through adaptive routing and arbitration module 214, which is operable to normalize confidence measures, apply domain-specific weighting, compute recency scores, and enforce composite output rules. Arbitration results are formatted into a schema-conformant representation for integration with curated dataset inputs and validation feedback at step 714.

In step 714, curated dataset inputs and validation feedback are integrated into the arbitration results. The system optimizes arbitration by incorporating external reference records and correction signals that provide authoritative or corrective context to the predictive outputs.

Integration may begin by retrieving reference records from curated or external data sources via an application programming interface. The system performs integrity validation on the retrieved records, such as computing cryptographic hash values and comparing them against stored signatures to confirm record authenticity. Once validated, the records are transformed into a schema-conformant representation by mapping their fields into the schema used for arbitration processing.

Validation feedback is normalized into a machine-readable format for compatibility with arbitration results. For example, user corrections captured through validation interface system 116 may be converted into vector-based signals that adjust weight assignments for specific predictive outputs. Correction signals may also reconfigure interrogation constraints or trigger parameter updates to specialized learner models, ensuring that arbitration reflects both external knowledge and validated feedback.

For instance, if arbitration results prioritize a generalized output that contradicts an authoritative domain record, the system adjusts the arbitration result by recalibrating the confidence values associated with each output and elevating the authoritative record. Similarly, if validation feedback specifies that a domain-specific SLAM misinterpreted an input field, the correction signal modifies its weighting in subsequent arbitration cycles to prevent repeated misclassification.

In certain embodiments, orchestration system 106 executes this integration through curated data interface 208 and validation interface 206, which supply schema-conformant reference records and normalized feedback signals to adaptive routing and arbitration module 214. The combined results serve as inputs to the synthesis stage at step 716.

In step 716, a synthesized response is generated from the arbitration results, curated dataset inputs, and validation feedback. The system consolidates these inputs into a unified output signal that resolves conflicts, incorporates authoritative reference data, and reflects corrections provided during validation.

The generation process may begin by aligning the arbitration results with schema-conformant reference records retrieved at step 714. This alignment ensures that selected predictive outputs are consistent with validated external knowledge sources. Next, the system applies adjustment vectors derived from validation feedback to recalibrate weight assignments across domain-specific and generalized outputs. These recalibrations allow the synthesized response to reflect both machine-executed arbitration and human-validated corrections.

The system may then construct a composite output that includes multimodal directives corresponding to the selected result set. For example, text tokens may be concatenated into a natural language sentence, audio tokens may be aligned with a phoneme-to-viseme map, and avatar cues may be generated to synchronize gesture and expression with spoken content. The synthesis logic preserves provenance metadata for each portion of the output, maintaining traceability of which model or reference source contributed to the final response.

As one example, if two SLAMs generate divergent outputs about a financial compliance requirement, arbitration logic may rank the outputs while external records confirm which rule is authoritative. Validation feedback may further indicate that the generalized output misapplied terminology. The system synthesizes a response that integrates the authoritative rule, adjusts the terminology, and packages the response as both a text directive and a time-aligned avatar-based message.

In various embodiments, orchestration system 106 provides arbitration results and correction lineage to response synthesis and delivery system 118, which executes multimodal rendering functions to generate the final synthesized response.

In step 718, the synthesized response is provided for presentation. The system transmits the consolidated output signal to a rendering channel associated with the requesting user session. The presentation may take the form of structured text, audio output, or avatar-based interaction, depending on modality parameters stored in the orchestration context.

To prepare the response for delivery, the system serializes the synthesized output into a channel-specific transmission format. For text responses, this may involve generating a UTF-8 encoded payload with metadata tags indicating source lineage. For audio responses, the system converts tokenized phoneme sequences into waveform data using a text-to-speech pipeline. For avatar responses, synchronized motion vectors are generated from viseme and gesture cues, producing a time-aligned stream suitable for rendering by a 3D animation engine.

The system ensures secure and accurate delivery by associating the response with a session identifier, applying encryption during transmission, and logging delivery status in orchestration datastore 220. For example, if a synthesized compliance directive is generated, the system may transmit both a textual representation and a digital personal display explanation to the user's smart glasses via user device 102, while recording a delivery confirmation and storing metadata for audit purposes.

In certain embodiments, orchestration system 106 invokes response synthesis and delivery system 118 to handle formatting and channel mapping, while network 120 facilitates the transmission to user device(s) 102.

In step 720, operational data is stored for further processing. The system records structured representations of the synthesized response together with arbitration lineage, confidence scores, and validation feedback metadata. This stored data supports later training, auditing, and retraining cycles by preserving the complete decision trace associated with the processed session.

The storage process includes normalizing multimodal features, arbitration results, and synthesized outputs into a schema-conformant record format. Each record may be indexed by session identifier, timestamp, and persona context to enable efficient retrieval and cross-session correlation. For example, embeddings generated during inference may be persisted in a vector-based repository, while arbitration priorities and feedback corrections are appended to a transactional datastore that maintains immutability of historical decisions.

In an embodiment, to ensure consistency, the system applies integrity checks such as hash validation over stored payloads and propagates metadata describing the processing pipeline version and active model parameters. In certain embodiments, orchestration datastore 220 manages session continuity logs, while training and optimization system 112 consumes archived records for dataset construction as described in FIG. 4.

For example, when a synthesized financial advisory response is generated for a user query, the system stores the structured input features, SLAM outputs, Butler output, arbitration ranking decisions, and final synthesized response in separate but linked data repositories. This enables later reproduction of the system's reasoning path for audit or retraining purposes.

As described, the process implemented in FIG. 7 provides a technically structured workflow for orchestrated multi-model reasoning over multimodal inputs. Unlike conventional systems that rely on a single generalized model to generate ad hoc outputs, the disclosed process enforces schema-conformant normalization, distributes structured signals to domain-specific models and a generalized agent, and applies arbitration logic with explicit confidence weighting, domain coefficients, and recency-of-evidence scoring. The integration of curated dataset records and validation feedback produces arbitration results with preserved provenance and correction lineage, ensuring that synthesized responses are both technically reproducible and auditable. In the context of guided venture development, these machine-executed processes allow the system to transform heterogeneous founder inputs into structured reasoning artifacts, apply conflict resolution across specialized and generalized modules, and deliver synthesized outputs as text, audio, or digital personal display interactions. This architecture addresses technical deficiencies of conventional ensemble reasoning systems by enabling adaptive, validated, and context-preserving outputs that remain consistent across iterative cycles of venture planning and execution.

For example, the disclosed systems may be applied as a guided venture development platform that adapts dynamically to a founder's experience, goals, and behavioral profile. For example, at step 702, multimodal inputs such as spoken ideas, typed notes, uploaded video clips, or gesture-based interactions may be obtained from a founder during an early ideation session. At step 704, these inputs are normalized and feature-extracted into structured signals that capture both semantic content and contextual markers such as tone, emphasis, or domain references. At step 706, the structured signals are distributed to specialized learner modules trained for distinct venture-building domains, including legal structuring, fundraising strategy, partnership development, and technical product planning, while concurrently being processed by a Butler agent configured for generalized reasoning. At steps 708 through 712, the domain-specific outputs and generalized output are compared using arbitration logic that incorporates confidence weighting, domain-specific coefficients, and recency of relevant evidence. At steps 714 through 718, curated datasets (e.g., regulatory templates, fundraising benchmarks, or market research records) and validation feedback (e.g., mentor or advisor corrections) are integrated into arbitration results, which are then synthesized into actionable guidance. At step 720, the synthesized response may be delivered to the founder in multiple formats, including structured text, spoken audio prompts, or a digital personal display guide that provides interactive dialogue. This arrangement enables the system not only to respond but also to interrogate ideas, detect contradictions, and strategically guide the founder through successive stages of venture development, from concept validation and pilot planning to go-to-market execution and scaling.

Process for Arbitration and Feedback Integration

Figure 8:
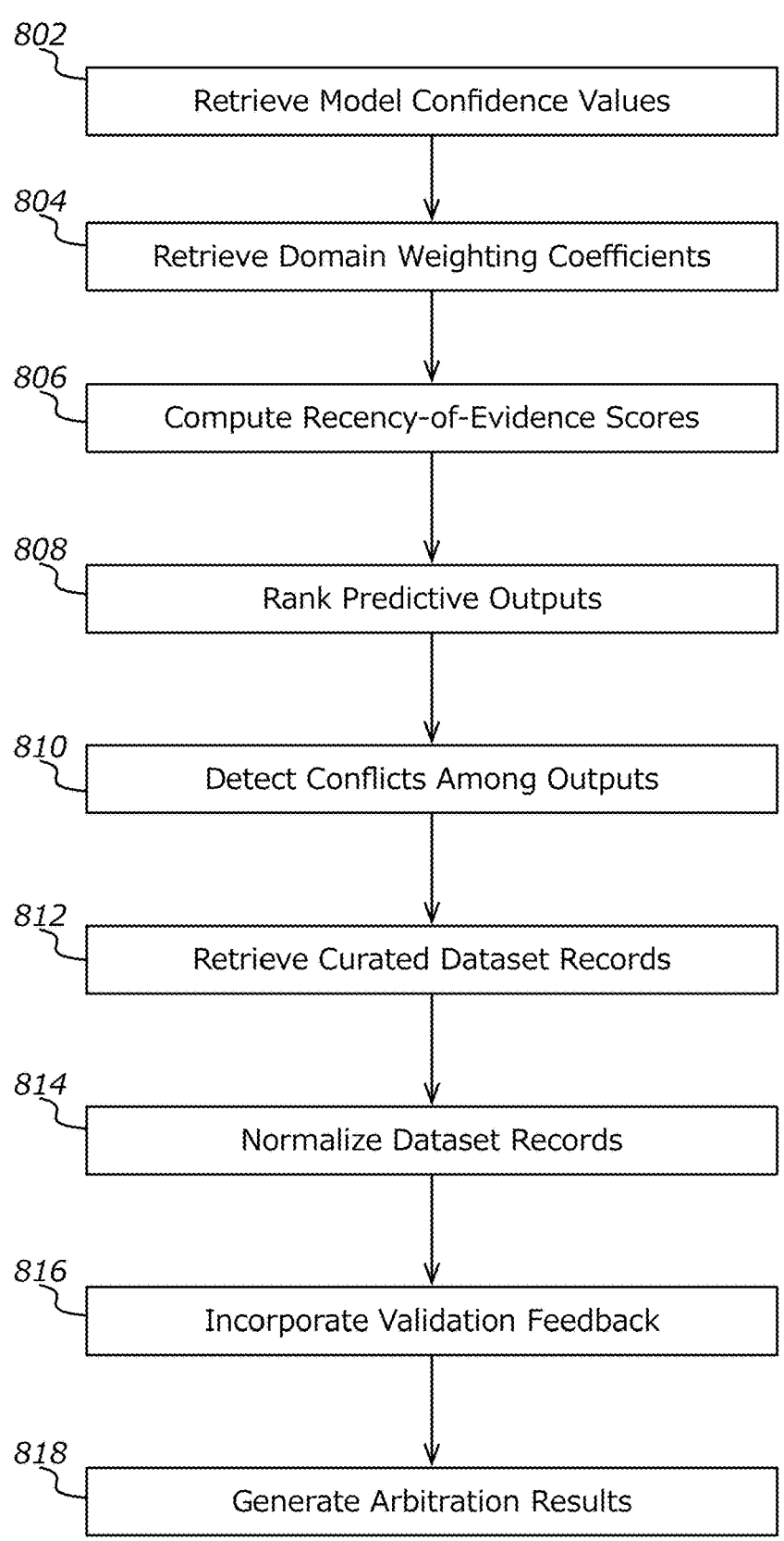
FIG. 8 illustrates an example process for conflict resolution in accordance with various embodiments.

FIG. 8 illustrates an example process for arbitration and feedback integration, in accordance with various embodiments. As shown, the sub-process includes conflict evaluation among predictive outputs, confidence scoring, priority assignment, and arbitration result generation, together with integration of curated dataset inputs and validation feedback. Each step is performed by machine-executed logic that applies structured rules to resolve inconsistencies, rank candidate outputs, and adapt arbitration parameters. The sub-process ensures that predictive outputs generated by specialized learner modules and the large language model agent are reconciled in a reproducible and schema-conformant manner. In certain embodiments, curated datasets and validation feedback are incorporated into the arbitration results to provide correction lineage and parameter updates, thereby supporting consistent refinement of synthesized responses. Other sub-process configurations may be used, as would be understood by a person of ordinary skill in the art, without departing from the scope of the invention.

At step 802, the system retrieves model-provided confidence values associated with predictive outputs. Each predictive output generated by a specialized learner module or the large language model agent is accompanied by a confidence score, which represents the probability distribution or likelihood measure assigned by the underlying model. More specifically, specialized learner modules may generate domain-specific confidence values derived from task-specific embedding spaces, probabilistic calibration layers, or softmax distributions over constrained domain vocabularies. The large language model agent may generate generalized confidence values through logit-normalization over token sequences or regression-based probability estimates for candidate outputs.

In certain embodiments, the retrieval process includes extracting confidence values from intermediate inference objects passed through orchestration system 106, ensuring that each predictive output is paired with its corresponding confidence metadata. For example, when a specialized learner module tasked with contract compliance generates a predictive output indicating "non-compliant clause detected," the module may also produce a confidence value of 0.87 based on logistic regression calibration. Similarly, the large language model agent may provide a generalized summary output with a confidence of 0.71 derived from beam-search probability weighting.

The retrieved confidence values are stored in arbitration buffers maintained by orchestration system 106, allowing subsequent steps to normalize, weight, and integrate the values into arbitration logic. In some implementations, the system applies pre-retrieval validation to ensure that all confidence values conform to a standardized numerical scale (e.g., 0-1 range) and that missing or malformed values are flagged for exception handling. By retrieving and aligning model confidence values in a structured and reproducible format, the system provides a technical basis for arbitration logic to evaluate the relative reliability of domain-specific and generalized predictive outputs.

At step 804, the system retrieves domain weighting coefficients associated with specialized learner modules and applies them to corresponding predictive outputs. A domain weighting coefficient is a scalar value or vector representation that encodes the relative importance of a particular domain when arbitration logic evaluates multiple predictive outputs. More specifically, these coefficients may be predefined based on system configuration, dynamically adjusted through training and optimization system 112, or derived from historical performance metrics logged in orchestration datastore 220.

In operation, the system associates each specialized learner module with its assigned domain weighting coefficient and binds the coefficient to the predictive output produced by that module. For example, a specialized learner module configured for financial risk reasoning may have a higher domain weighting coefficient than a module trained for formatting compliance, reflecting the system's prioritization of substantive reasoning over stylistic validation. The binding process ensures that arbitration logic evaluates the predictive outputs with proportional emphasis on the relevance of their generating domains.

In certain embodiments, domain weighting coefficients are retrieved from schema-conformant metadata stores and validated against a versioning record to confirm alignment with current arbitration policies. For example, the system may retrieve a coefficient vector {0.6, 0.3, 0.1} corresponding to three active specialized learner modules and apply each weight to scale the associated predictive output scores prior to ranking. This enables the arbitration process to incorporate domain-specific prioritization in a machine-executed and auditable manner, ensuring that model outputs are not treated as uniformly weighted signals when conflicts arise.

At step 806, the system computes recency-of-evidence scores by evaluating timestamps and lineage metadata associated with curated dataset records that support predictive outputs. A recency-of-evidence score is a numerical value that reflects the temporal proximity and relevance of the data on which a predictive output is based. More specifically, the system retrieves timestamp fields, session identifiers, and update lineage from curated dataset inputs and correlates them with predictive outputs received from specialized learner modules and the large language model agent.

The system applies algorithmic functions to calculate recency measures, such as exponential decay weighting, sliding-window normalization, or temporal bucketing, to assign higher scores to outputs supported by more recent or frequently validated evidence. For example, when two predictive outputs conflict, the output supported by curated dataset records updated within the last 24 hours may be assigned a higher recency-of-evidence score than one supported by records updated six months prior.

In certain embodiments, the system integrates lineage metadata into the recency computation to track the provenance of supporting data. This may include associating predictive outputs with curated dataset records validated through cryptographic hash checks, annotated by human reviewers, or derived from schema-conformant transformations. For example, an output referencing a dataset record with a validated lineage chain extending to an authoritative regulatory feed may receive a recency-of-evidence score that reflects both freshness and verified provenance.

Computed recency-of-evidence scores are stored alongside retrieved confidence values and domain weighting coefficients in arbitration buffers maintained by orchestration system 106. This structured representation enables arbitration logic to incorporate temporal freshness as a machine-executed parameter during conflict resolution and priority assignment.

At step 808, the system applies arbitration logic to rank predictive outputs based on confidence values, domain weighting coefficients, and recency-of-evidence scores. Each predictive output is represented as a structured record containing these parameters, enabling deterministic comparison across outputs generated by specialized learner modules and the large language model agent.

The system executes a ranking function that aggregates the parameters into a composite priority score. More specifically, arbitration logic performs weighted summation, rule-based normalization, or multi-factor scoring models to combine the confidence values, domain weighting coefficients, and recency-of-evidence scores. For example, a predictive output with moderate confidence but strong domain weighting and recent supporting evidence may outrank an output with higher confidence but outdated or less domain-relevant support.

In some embodiments, ranking incorporates schema alignment checks to ensure that outputs being compared are mapped to consistent fields within a shared schema representation. For example, outputs that resolve to the same slot in a requirement schema are ranked against each other directly, while outputs addressing distinct schema fields are stored for parallel arbitration.

The ranked outputs are stored in arbitration queues managed by orchestration system 106. Each queue entry preserves the provenance of the predictive output, including identifiers for the originating learner module, supporting curated dataset records, and validation corrections. These preserved records ensure that the ranking process remains reproducible and auditable across arbitration cycles.

At step 810, the system evaluates the ranked predictive outputs to detect conflicts, contradictions, or overlapping claims between domain-specific outputs and the generalized output. Conflict detection is a machine-executed process that compares structured output representations to determine whether multiple outputs propose inconsistent values, divergent classifications, or mutually exclusive recommendations.

More specifically, the system performs semantic comparison of output tokens, logical consistency checks against a requirement schema, and cross-model divergence scoring. For example, if one specialized learner module produces an output classifying an input as "valid," while another generates a conflicting classification of "invalid," the system registers a contradiction. Similarly, if the generalized output omits schema fields required by domain-specific outputs, the system flags the omission as a structural conflict.

In certain embodiments, conflict detection is augmented by contradiction tests and gap analysis functions implemented within orchestration system 106. Contradiction tests apply natural-language inference scoring between outputs, while gap analysis functions evaluate whether required schema fields remain unfulfilled or contain conflicting assignments. For example, when two outputs populate the same schema slot with incompatible values—such as a "true" Boolean value versus a "false" Boolean value—the system identifies the overlap as a conflict requiring arbitration.

Detected conflicts are encoded as structured contradiction records stored alongside the ranked predictive outputs. Each record preserves the identifiers of the conflicting outputs, the nature of the inconsistency, and the schema context in which the inconsistency arose. This structured conflict data is later consumed by arbitration logic when generating arbitration results at step 818.

At step 812, the system retrieves reference records from curated data sources for integration into the arbitration process. These reference records provide external context that supplements predictive outputs generated by specialized learner modules and the large language model agent. More specifically, the system invokes a secure application programming interface (API) to query curated data sources 114. Retrieved reference records may include structured databases, annotated knowledge repositories, regulatory feeds, or partner-provided datasets. For example, a domain-specific SLAM tasked with financial reasoning may be supplemented by curated balance-sheet records or regulatory filings accessed through the API.

Upon retrieval, the system validates the integrity of the reference records using cryptographic hash checks and lineage verification procedures. In one embodiment, each record includes a pre-computed hash value generated at the source. The system re-computes the hash locally and compares the two values to detect tampering. Lineage verification may further involve confirming that the record originated from an authorized endpoint or includes an unbroken validation chain extending from a trusted source.

Retrieved reference records are assigned unique identifiers and linked to the predictive outputs they support. These records are stored temporarily in arbitration buffers managed by orchestration system 106, ensuring that curated evidence can be correlated with specific outputs during conflict resolution at later stages of the arbitration process.

At step 814, the system transforms validated curated dataset records into a schema-conformant representation aligned with the structured signals generated from multimodal inputs. This transformation ensures interoperability between external evidence sources and predictive outputs from specialized learner modules and the large language model agent. More specifically, the system applies schema adapters that map heterogeneous record formats into a unified internal schema. For example, a curated dataset record containing JSON-formatted financial entries may be converted into key-value pairs aligned with schema slots defined by orchestration system 106, while XML-based medical records may be mapped into field-value tuples compatible with domain-specific SLAM adapters.

Normalization may involve unit conversion, ontology alignment, and field disambiguation to ensure consistent representation. For example, a curated dataset record with a date formatted as "MM/DD/YYYY" may be normalized to ISO 8601 format, or a record with synonymous field names such as "DOB" and "Date of Birth" may be unified under a single schema attribute.

In certain embodiments, the system also generates lineage metadata during normalization, tagging each transformed record with its source identifier, transformation rules applied, and schema version. This metadata supports later auditing, arbitration, and rollback operations.

Normalized curated dataset records are stored in arbitration buffers alongside predictive outputs and contradiction records, providing structured, validated evidence for integration at step 818.

At step 816, the system incorporates validation feedback into the arbitration process. Validation feedback refers to correction signals generated by validation interface system 116, which may originate from human reviewers, third-party oversight systems, or automated integrity monitors.

In an embodiment, the system first receives the correction signals, which may include categorical corrections (e.g., "classification incorrect"), quantitative adjustments (e.g., "confidence reduced to 0.65"), or schema slot completions (e.g., "missing field populated with value"). Each correction signal is tagged with session identifiers, timestamps, and reviewer metadata when applicable. More specifically, the system normalizes the correction signals into machine-readable form. This normalization may include mapping free-text reviewer annotations into structured schema fields, translating categorical feedback into Boolean or enumerated values, or aligning numeric corrections with corresponding confidence metrics. For example, a human reviewer inputting "contradictory output" may be transformed into a contradiction flag applied to a pair of predictive outputs, while an instruction such as "increase priority of medical source" may be translated into an updated domain weighting coefficient.

Once normalized, the validation feedback is integrated into arbitration weighting logic. This integration allows arbitration system components to adjust confidence values, modify weighting coefficients, or override recency-of-evidence scores. For example, a validated correction indicating a misclassified schema slot may directly reduce the priority of the associated predictive output in subsequent ranking.

Corrected arbitration weights and updated parameters are preserved in arbitration buffers along with provenance metadata, ensuring that integrated validation feedback can be audited and reapplied across iterative arbitration cycles.

At step 818, the system generates arbitration results by combining ranked predictive outputs, normalized curated dataset records, and integrated validation feedback. Arbitration results represent the resolved decision state of the system, capturing both the selected predictive outputs and the structured evidence that supports them. More specifically, arbitration logic merges prioritized outputs with corroborating curated dataset records, applies adjustments derived from validation feedback, and resolves detected contradictions into a single synthesized outcome. For example, when two specialized learner modules propose conflicting classifications, the system may select the higher-ranked output but annotate it with corroborating curated evidence and apply confidence calibration based on human-provided feedback.

The system preserves provenance and correction lineage for each arbitration result. This includes identifiers for the originating learner modules, dataset records used for corroboration, and validation feedback signals applied during arbitration. In certain embodiments, this lineage data is stored in structured arbitration logs, enabling reproducibility, auditability, and rollback if arbitration parameters are reconfigured.

Arbitration results are formatted into schema-conformant representations suitable for subsequent response synthesis. Each arbitration result is stored with metadata indicating the priority value, supporting dataset identifiers, validation corrections applied, and schema field coverage.

In some embodiments, arbitration results may include composite outputs formed by combining segments of multiple predictive outputs while preserving individual provenance markers. For example, the system may generate a composite response by integrating a domain-specific recommendation from one SLAM with a generalized rationale from the Butler agent, ensuring both contributions remain attributable.

As described, the arbitration process illustrated in FIG. 8 provides a machine-executed framework for resolving conflicts among predictive outputs, integrating curated dataset records, and applying validation feedback in a reproducible and auditable manner. Unlike conventional aggregation methods that rely on unstructured ensemble voting, the disclosed arbitration logic explicitly incorporates confidence scoring, domain weighting, temporal recency, curated evidence normalization, and correction signal integration into its decision-making process. This structured approach enforces schema alignment, preserves provenance and correction lineage, and ensures that synthesized outcomes are generated through deterministic and auditable technical operations. In various embodiments, these processes enable orchestration system 106 to coordinate outputs from specialized learner modules 108 and Butler agent 110 into technically validated arbitration results, forming the basis for subsequent response synthesis and delivery.

For example, the disclosed arbitration framework may be applied within a guided startup development platform that adapts dynamically to a founder's inputs and venture stage. Multimodal inputs such as spoken ideas, typed notes, or gesture-based selections may be structured into signals distributed across specialized learner modules trained for domains including legal structuring, fundraising, partnership development, and technical product planning, as well as to a generalized Butler agent. Arbitration logic then reconciles potentially conflicting outputs by applying confidence scoring, domain weighting, and recency-of-evidence measures while integrating curated venture datasets and validation feedback from advisors or reviewers. The resulting arbitration results are synthesized into responses delivered as text, spoken audio, or digital personal display guidance, enabling the system to interrogate assumptions, surface contradictions, and strategically guide founders from concept validation through go-to-market execution and scaling strategies.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

In certain embodiments, the disclosed techniques may also be implemented within robotic or mechatronic systems that incorporate sensor arrays, actuators, and embedded controllers configured to execute orchestration logic locally or in coordination with distributed computing nodes. For example, a robotic platform may implement portions of the orchestration system 106 or specialized learner modules 108 to enable adaptive task sequencing, multimodal signal interpretation, or physical embodiment of synthesized responses. Such robotic integrations may include microcontroller-based subsystems, embedded GPUs, or hardware accelerators designed for low-latency inference and feedback synchronization, extending the architecture to physical interactive environments while maintaining schema-conformant coordination across digital and embodied components.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above-mentioned systems, modules, interfaces, components, or the like may comprise hardware and/or software as described herein. For example, the systems described in association with ingestion system 104, orchestration system 106, specialized learner modules (SLAMs) 108, Butler agent 110, training and optimization system 112, curated/external data sources 114, validation interface system 116, and response synthesis and delivery system 118, as well as subcomponents thereof, may comprise computing hardware and/or software implementations. Furthermore, any of the above-mentioned systems, modules, interfaces, components, or the like may use and/or comprise an application programming interface (API) for communicating with other systems, modules, interfaces, components, or the like for obtaining and/or providing data or information.

Figure 9:
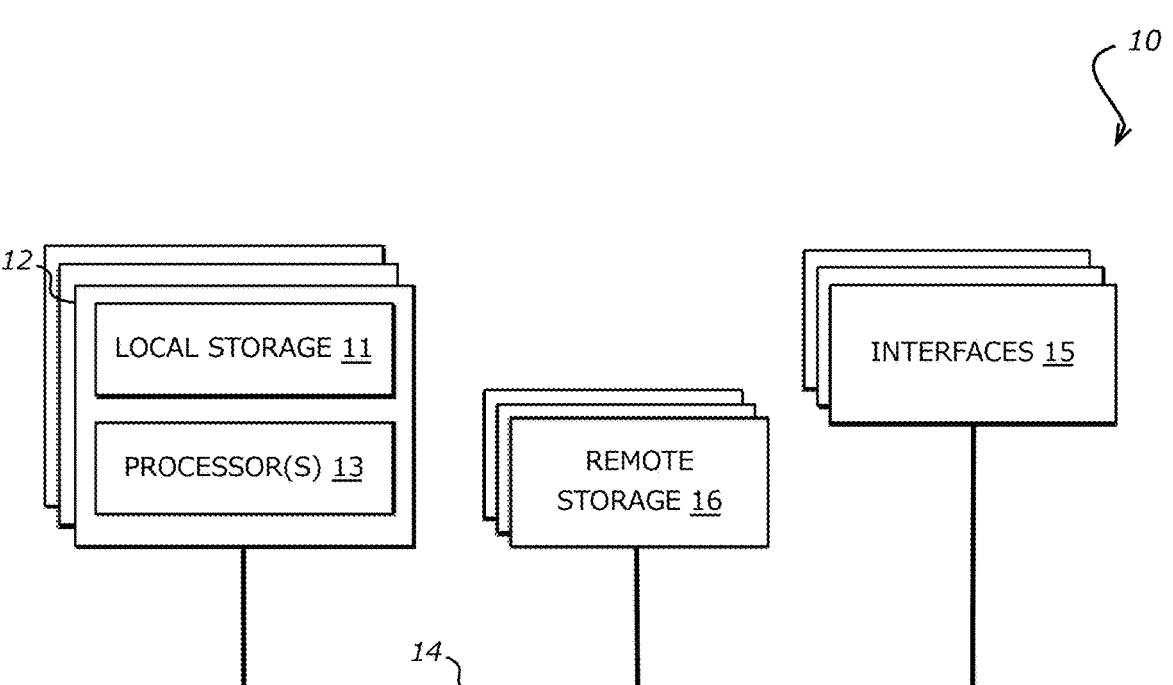
FIG. 9 illustrates an example device-level architecture that can support various embodiments.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
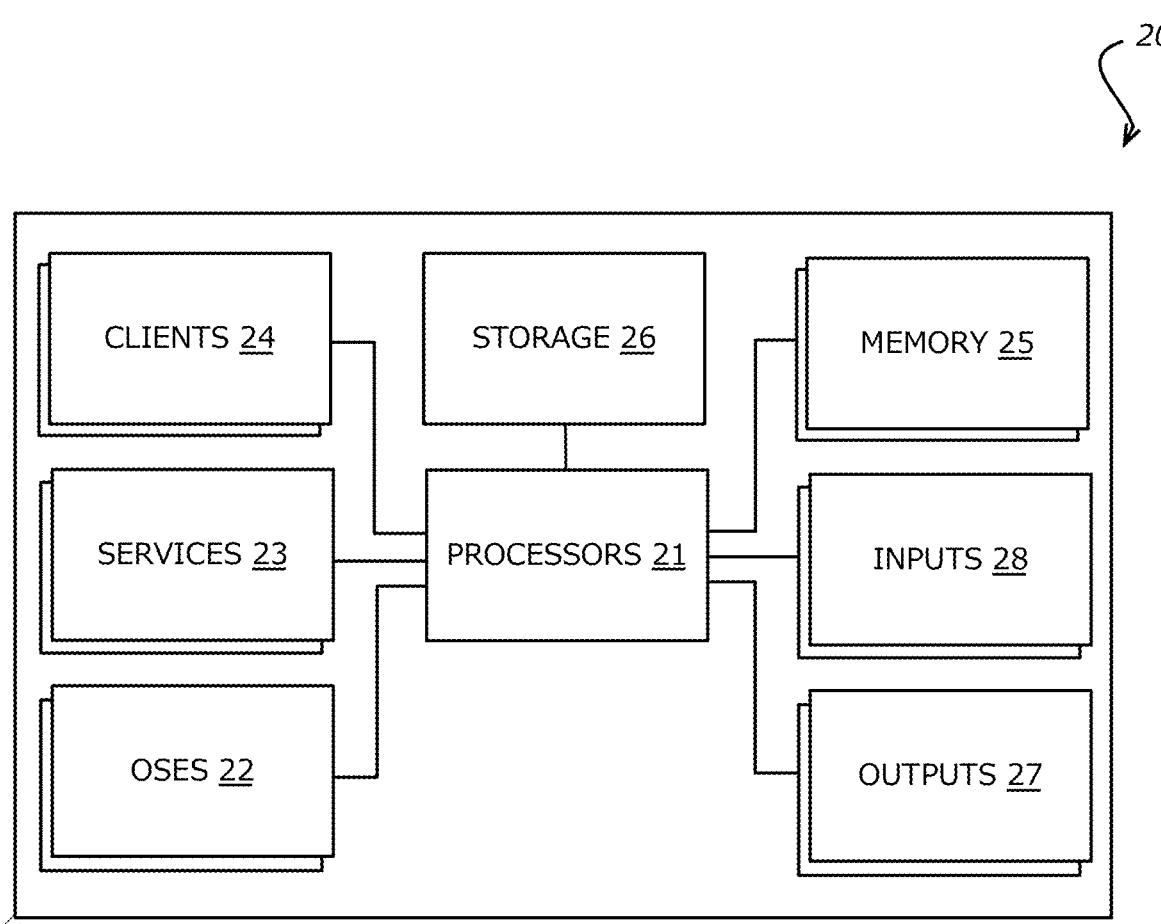
FIG. 10 illustrates components of a computing device in accordance with various embodiments.

In some embodiments, systems may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9).

Examples of storage devices 26 include flash memory, magnetic hard drive, CD-ROM, and/or the like.

Figure 11:
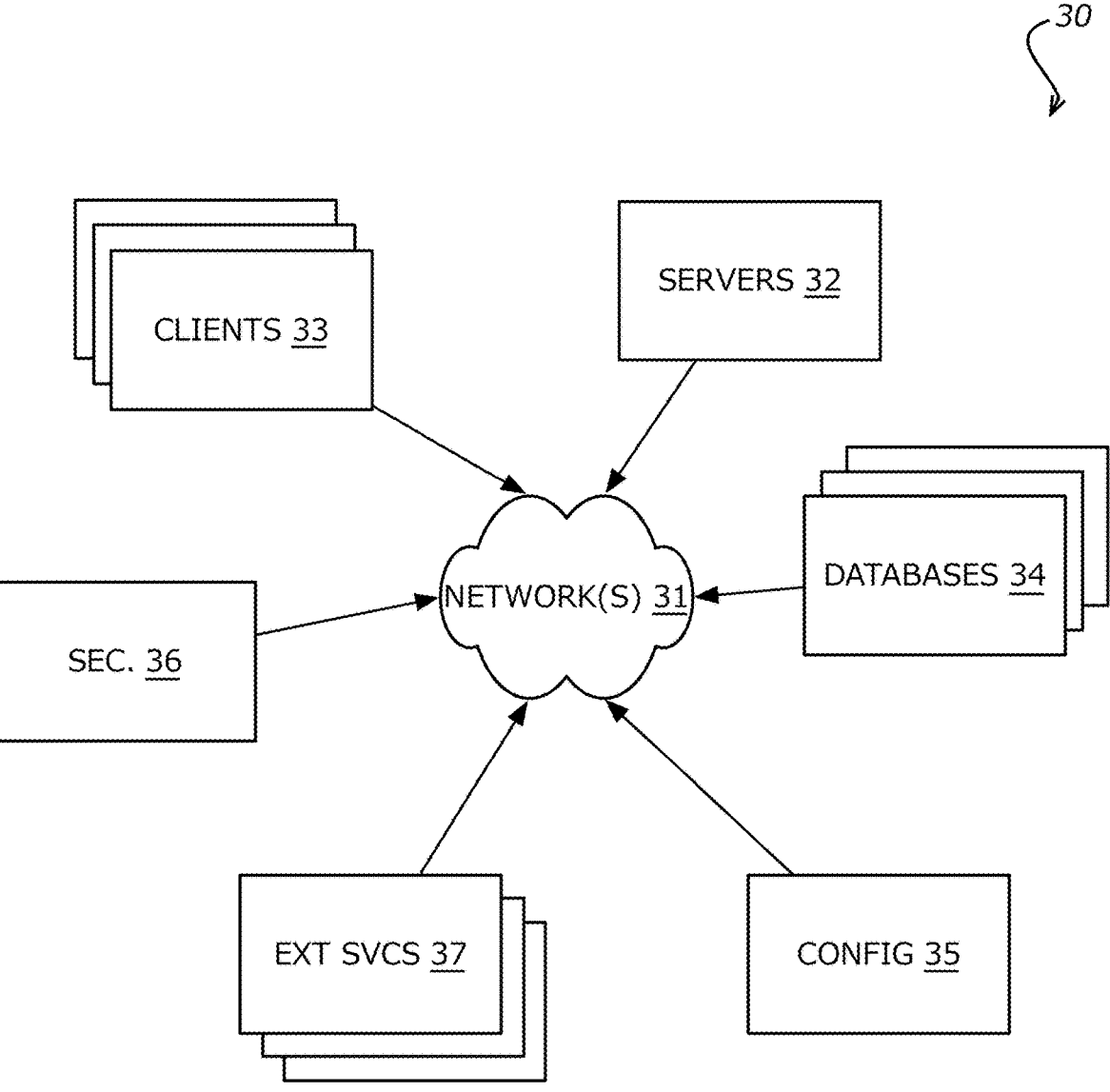
FIG. 11 illustrates an exemplary architecture of a system in accordance with various embodiments.

In some embodiments, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 12:
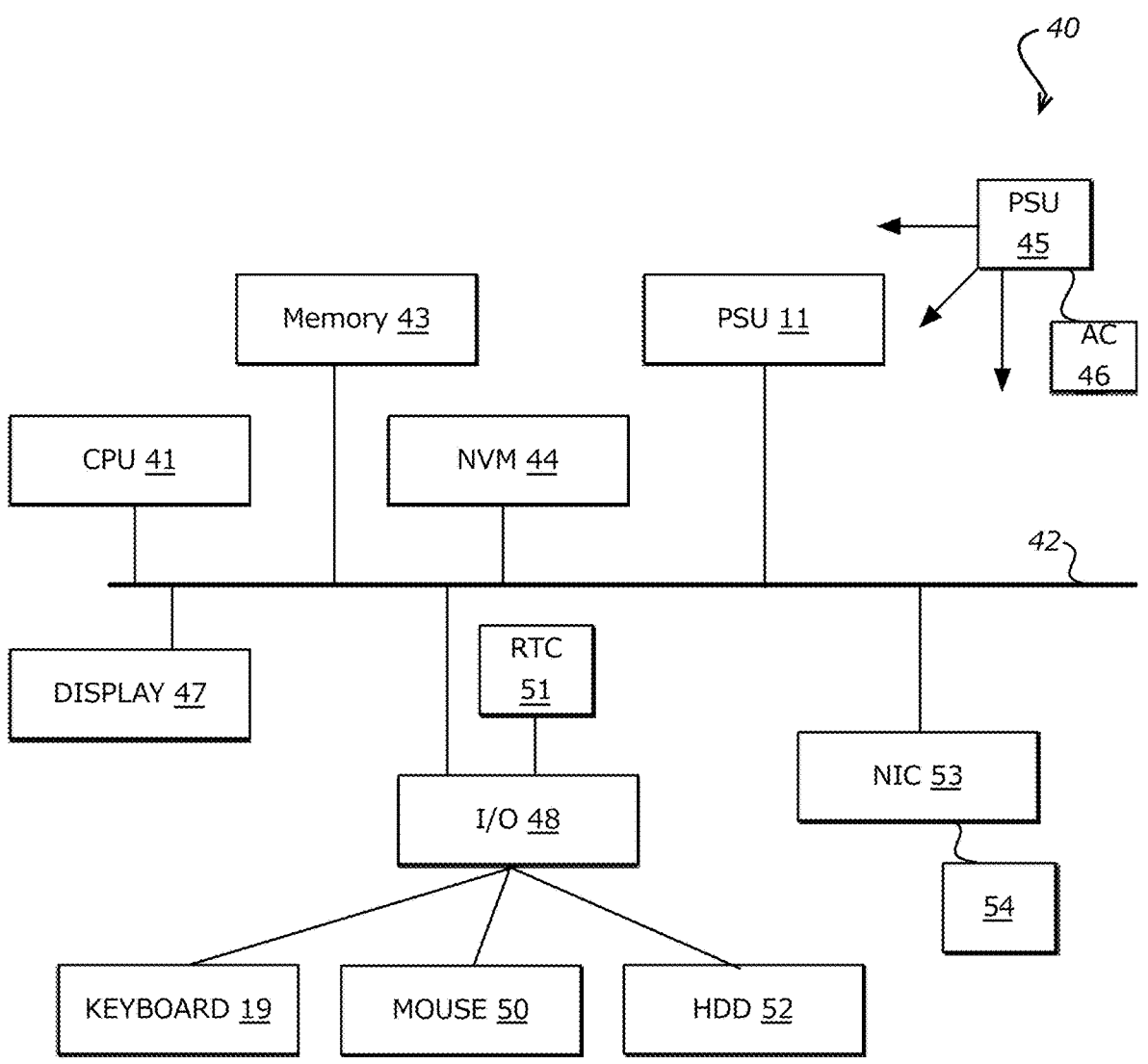
FIG. 12 illustrates components of a computing device in accordance with various embodiments.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computing system for orchestrated multi-model processing and response generation, the computing system comprising:
   a processor; and
   a memory storing instructions that, when executed by the processor, cause the computing system to:
      receive multimodal input data comprising at least one of text data, audio data, video data, or gesture data;
      generate structured signals from the multimodal input data;
      distribute the structured signals to a plurality of specialized learner models;
      execute each of the plurality of specialized learner models, each comprising a small language model trained for domain-specific reasoning, to generate respective domain-specific outputs;
      execute a large language model agent configured for generalized processing to generate a generalized output;
      apply arbitration logic to resolve conflicts among the respective domain-specific outputs and the generalized output;
      generate arbitration results using the arbitration logic;
      integrate curated dataset inputs and validation feedback into the arbitration results;

generate a synthesized response from the arbitration results, the curated dataset inputs, and the validation feedback, wherein generating the synthesized response includes:
         generating a text output as a first response modality;
         generating an audio output as a second response modality;
         generating audio directives and visual directives from the synthesized response;
         mapping tokens from the synthesized response to viseme cues and gesture cues to generate mapped directives;
         time-aligning the audio directives and the mapped directives to generate aligned directives;
         generating a digital personal display output as a third response modality using the aligned directives; and
      transmit the synthesized response for presentation to a user.

2. The computing system of claim 1, wherein generating structured signals from the multimodal input data comprises:
   normalizing modality-specific streams to generate normalized streams in a common representation format;
   extracting features from the normalized streams to generate extracted features, wherein the extracted features comprise at least one of linguistic tokens, audio embeddings, visual frame descriptors, or gesture vectors;
   mapping the extracted features to a temporal index to generate temporally aligned features;
   propagating the temporally aligned features into a schema-conformant representation to generate schema-conformant features; and
   generating structured signals conformant to the schema-conformant features.

3. The computing system of claim 2, wherein parameterizing subsequent generation requests comprises:
   generating a summary vector from a time-ordered sequence of prior inputs and prior outputs;
   retrieving a persona identifier associated with a session to generate an active persona identifier;
   retrieving dependency-graph data associated with a workflow to generate dependency-graph metadata; and
   composing a context payload including the summary vector, the active persona identifier, and the dependency-graph metadata.

4. The computing system of claim 1, wherein processing to generate the synthesized response further comprises applying interrogation logic, the applying of the interrogation logic comprising:
   performing contradiction tests between candidate predictive outputs to generate detected inconsistencies;
   performing coverage analysis by comparing the candidate predictive outputs against a requirement schema to generate unfulfilled schema fields and unsatisfied constraint conditions; and
   generating interrogation prompts from the detected inconsistencies, the unfulfilled schema fields, and the unsatisfied constraint conditions.

5. The computing system of claim 4, wherein evaluating candidate predictive outputs comprises:
   computing natural-language inference scores between the candidate predictive outputs to generate inference score results;
   computing a coverage score by comparing the candidate predictive outputs against the requirement schema;
   applying a threshold to the coverage score to generate a thresholded coverage result; and emitting a targeted prompt requesting a slot value defined in the requirement schema and identified as unfulfilled based on the thresholded coverage result.

6. The computing system of claim 1, wherein the arbitration logic assigns a priority to a predictive output by:

retrieving a confidence value generated by the predictive output;

retrieving a domain weighting coefficient associated with a specialized learner model or the large language model agent that generated the predictive output;

computing a recency-of-evidence score from curated dataset inputs to generate a recency score; and combining the confidence value, the domain weighting coefficient, and the recency score to generate a priority assigned to the predictive output.

7. The computing system of claim 6, wherein generating the arbitration results comprises:

ranking predictive outputs according to respective assigned priorities to generate a ranked output set; and selecting an arbitration result from the ranked output set, the arbitration result comprising either a top-ranked output or a composite output formed by concatenating or templating portions of multiple predictive outputs while preserving provenance metadata for each contributing portion.

8. The computing system of claim 1, wherein integrating curated dataset inputs and validation feedback comprises:

retrieving reference records from a curated dataset to generate retrieved reference records;

validating the retrieved reference records using cryptographic hash checks to generate validated reference records;

transforming the validated reference records into a schema-conformant representation to generate transformed reference records;

receiving correction signals from an external feedback interface to generate received correction signals;

normalizing the received correction signals into a machine-readable format to generate normalized correction signals; and updating at least one of arbitration weights, interrogation constraints, or a registered model parameter set for a specialized learner model or the large language model agent using the transformed reference records and the normalized correction signals.

9. The computing system of claim 1, wherein distributing structured signals comprises:

selecting a subset of specialized learner models from the plurality of specialized learner models based on workflow context, domain indicators, or persona activation state to generate selected specialized learner models;

executing the selected specialized learner models in parallel to generate executed specialized learner models;

generating a domain-specific output from each of the executed specialized learner models; and generating a confidence value associated with each domain-specific output.

10. A method for orchestrated multi-model processing and response generation, the method comprising:

receiving multimodal input data comprising at least one of text data, audio data, video data, or gesture data;

generating structured signals from the multimodal input data;

distributing the structured signals to a plurality of specialized learner models;

executing each of the plurality of specialized learner models, each comprising a small language model trained for domain-specific reasoning, to generate respective domain-specific outputs;

executing a large language model agent configured for generalized processing to generate a generalized output;

applying arbitration logic to resolve conflicts among the respective domain-specific outputs and the generalized output;

generating arbitration results using the arbitration logic;

integrating curated dataset inputs and validation feedback into the arbitration results;

generating a synthesized response from the arbitration results, the curated dataset inputs, and the validation feedback, wherein generating the synthesized response includes:

generating a text output as a first response modality;

generating an audio output as a second response modality;

generating audio directives and visual directives from the synthesized response;

mapping tokens from the synthesized response to viseme cues and gesture cues to generate mapped directives;

time-aligning the audio directives and the mapped directives to generate aligned directives;

generating a digital personal display output as a third response modality using the aligned directives; and transmitting the synthesized response for presentation to a user.

11. The method of claim 10, wherein applying arbitration logic comprises:

maintaining a session-specific state store keyed by a track identifier and a persona identifier to generate a maintained state store;

recording a time-ordered sequence of prior inputs and prior outputs in the maintained state store;

recording workflow dependency data in the maintained state store to generate dependency-graph metadata; and retrieving the time-ordered sequence, the persona identifier, and the dependency-graph metadata from the maintained state store to parameterize a subsequent generation request.

12. The method of claim 10, wherein generating the synthesized response comprises applying interrogation logic, the applying of the interrogation logic comprising:

performing contradiction tests between candidate predictive outputs to generate detected inconsistencies;

performing coverage analysis by comparing the candidate predictive outputs against a requirement schema to generate unfulfilled schema fields and unsatisfied constraint conditions; and generating interrogation prompts from the detected inconsistencies, the unfulfilled schema fields, and the unsatisfied constraint conditions.

13. The method of claim 10, wherein applying arbitration logic comprises:

retrieving a confidence value associated with a predictive output;

retrieving a domain weighting coefficient associated with a specialized learner model or a large language model agent that generated the predictive output;

computing a recency-of-evidence score from curated dataset inputs to generate a recency score; and combining the confidence value, the domain weighting coefficient, and the recency score to generate a priority assigned to the predictive output.

14. The method of claim 10, wherein integrating curated dataset inputs and validation feedback comprises:

retrieving reference records from a curated dataset via an application programming interface to generate retrieved reference records;

validating the retrieved reference records using cryptographic hash checks to generate validated reference records;

transforming the validated reference records into a schema-conformant representation to generate transformed reference records;

receiving correction signals from an external feedback interface to generate received correction signals;

normalizing the received correction signals into a machine-readable format to generate normalized correction signals; and updating at least one of arbitration weights, interrogation constraints, or a registered model parameter set using the transformed reference records and the normalized correction signals.

15. The method of claim 10, wherein distributing the structured signals comprises:

selecting a subset of specialized learner models from the plurality of specialized learner models based on workflow context, domain indicators, or persona activation state to generate selected specialized learner models;

executing the selected specialized learner models in parallel to generate executed specialized learner models;

generating a domain-specific output from each of the executed specialized learner models; and generating a confidence value associated with each domain-specific output.

16. A non-transitory computer-readable storage medium storing instructions that, when executed by at least one processor of a computing system, cause the computing system to:

receive multimodal input data comprising at least one of text data, audio data, video data, or gesture data;

generate structured signals from the multimodal input data;

distribute the structured signals to a plurality of specialized learner models;

execute each of the plurality of specialized learner models, each comprising a small language model trained for domain-specific reasoning, to generate respective domain-specific outputs;

execute a large language model agent configured for generalized processing to generate a generalized output;

apply arbitration logic to resolve conflicts among the respective domain-specific outputs and the generalized output;

generate arbitration results using the arbitration logic;

integrate curated dataset inputs and validation feedback into the arbitration results;

generate a synthesized response from the arbitration results, the curated dataset inputs, and the validation feedback, wherein generating the synthesized response includes:

generating a text output as a first response modality;

generating an audio output as a second response modality;

generating audio directives and visual directives from the synthesized response;

mapping tokens from the synthesized response to viseme cues and gesture cues to generate mapped directives;

time-aligning the audio directives and the mapped directives to generate aligned directives;

generating a digital personal display output as a third response modality using the aligned directives; and transmit the synthesized response for presentation to a user.

17. The non-transitory computer-readable storage medium of claim 16, wherein the instructions further cause the computing system to:

retrieve reference records from a curated dataset via an application programming interface to generate retrieved reference records;

validate the retrieved reference records using cryptographic hash checks to generate validated reference records;

transform the validated reference records into a schema-conformant representation to generate transformed reference records;

receive correction signals from an external feedback interface to generate received correction signals;

normalize the received correction signals into a machine-readable format to generate normalized correction signals; and update at least one of arbitration weights, interrogation constraints, or a registered model parameter set using the transformed reference records and the normalized correction signals.

\* \* \* \* \*